(12) United States Patent
Basra et al.

(10) Patent No.: US 10,977,699 B2
(45) Date of Patent: Apr. 13, 2021

(54) DIGITAL SIGNAGE SHIM LAYER

(71) Applicant: Verizon Patent and Licensing Inc., Arlington, VA (US)

(72) Inventors: Arvind Basra, Glen Ridge, NJ (US); John J Arky, Los Angeles, CA (US); Robert Kaphan, Bloomsbury, NJ (US); Antonio M Osorio, Jersey City, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 223 days.

(21) Appl. No.: 15/662,435

(22) Filed: Jul. 28, 2017

(65) Prior Publication Data

US 2019/0034981 A1   Jan. 31, 2019

(51) Int. Cl.
*G06Q 30/02* (2012.01)
*H04L 29/08* (2006.01)
*H04L 29/06* (2006.01)

(52) U.S. Cl.
CPC ....... *G06Q 30/0277* (2013.01); *H04L 63/168* (2013.01); *H04L 67/125* (2013.01); *H04L 67/16* (2013.01); *H04L 67/32* (2013.01); *H04L 67/34* (2013.01); *H04L 63/0428* (2013.01); *H04L 67/02* (2013.01); *H04L 67/14* (2013.01)

(58) Field of Classification Search
CPC ... G06Q 30/0277; H04L 67/125; H04L 67/14; H04L 67/16; H04L 63/168; H04L 63/0428; H04L 67/32; H04L 67/34; H04L 67/02
See application file for complete search history.

(56) References Cited

U.S. PATENT DOCUMENTS

| | | | | |
|---|---|---|---|---|
| 9,866,459 | B1 * | 1/2018 | Joliveau | H04L 43/0823 |
| 2003/0140226 | A1 * | 7/2003 | Yamamoto | H04L 63/0823 |
| | | | | 713/156 |
| 2006/0288300 | A1 * | 12/2006 | Chambers | G06F 3/04886 |
| | | | | 715/744 |
| 2008/0126943 | A1 * | 5/2008 | Parasnis | G06Q 10/10 |
| | | | | 715/730 |
| 2009/0240745 | A1 * | 9/2009 | Stahl | G06F 16/1734 |
| 2014/0006138 | A1 * | 1/2014 | Black | G06Q 30/0251 |
| | | | | 705/14.41 |
| 2016/0080445 | A1 * | 3/2016 | Kazerani | H04L 65/4076 |
| | | | | 709/219 |
| 2018/0091568 | A1 * | 3/2018 | Edgington, Jr. | H04L 65/4069 |
| 2018/0276716 | A1 * | 9/2018 | Mino | G06Q 30/0272 |

OTHER PUBLICATIONS

"Cron Job to copy file from one location to another for new files," Apr. 15, 2011, Server Fault, https://serverfault.com/questions/259938/cron-job-to-copy-file-from-one-location-to-another-for-new-files-daily. (Year: 2011).*

* cited by examiner

*Primary Examiner* — Andrew T Chiusano

(57) ABSTRACT

A device may download a session configuration file from a server over a network, obtain one or more parameters from within the session configuration file, download a content package based on the one or more parameters, and store the content package in a temporary folder. The device may also uncompressing the content package into a content folder in the temporary folder. The content folder includes resources that correspond to widgets in a template, wherein the content folder further includes the template, and wherein the template specifies a layout of the widgets on a page to be output to a display device.

20 Claims, 30 Drawing Sheets

| PROPERTY | DESCRIPTION |
| --- | --- |
| metrics_reporting_interval | How often metrics module 480 may send its report to server URL with a list of "resource name:value" pairs (e.g., for the number of times each resource was played during the past time interval). |
| metrics_reporting_offset_time | Offset time in number of minutes from midnight of the calendar day that Metrics reporting interval starts |
| metrics_reporting_server_URL | REST API URL to the reporting server. This URL may be used by metrics module 480 to report unicast and multicast usage during a reporting interval |
| default_config_version | Version number of this configuration file. This value may be used to compare with the config_file_version_num sent in a session config file. If the two version numbers are different then DSSL client 232 may retrieve the updated config file from the default_config_URL |
| default_config_URL | REST API URL to obtain the default DSSL configuration file for this particular device. DSSL client 232 detects an updated version of the DSSL configuration file by comparing the config_file_version_num in the session config file and the default_config_version. In one implementation, DSSL client 232 may send "IMEI":"IMEI value" in the message body of the message to the default_config_URL. The server may respond with the "parameter_name":"parameter_value" pairs for the updated DSSL configuration file. |
| session_config_polling_interval | Polling interval used by DSSL 232 client to check for an updated session configuration file using the REST API URL. |
| REST_API_URL | DSSL client 232 posts to this URL with "IMEI":"IMEI value" contained in the message body. The server may respond with either HTTP 204 if no content packages are available or with the set of name-value pairs (ie. "parameter":"parameter value") for the session config file. |

| PROPERTY | DESCRIPTION |
|---|---|
| content_pkg_service_ID | Service ID used by caching service 462 to receive content packages over LTE Multicast. Caching service 462 may send the service ID to middleware 468 to start a multicast service (aka session) for receiving content packages over eMBMS. When Service ID is present, unicast content package URLs will also be included, for failover retrieval should multicast service be unavailable at scheduled delivery time. |
| unicast_content_pkg | An array of string pairs containing:<br><br>1 - URLs indicating the location of content packages for unicast retrieval by DSSL client 232.<br><br>2 - 128-bit MD5 hash checksums in hex for content package unicast URLs (above). The server may remove the MD5 for any content package unicast URL that should not be downloaded. The server wmay remove all MD5's during quiet period. DSSL client 232 must check the MD5 to determine if the content package was updated and be downloaded.<br><br>In JSON, this array may be formatted as:<br><br>"unicast_content_pkg":[<br>{<br>   "URL":"http://...",<br>   "MD5":"yny5QeyH3yaXXhz7A8xWEQ==“<br>},<br><br>{<br>   "URL":"http://...",<br>   "MD5":"yny5QeyH3yaXXh32E5xUIF==“<br>}]<br><br>To skip an MD5, use the following:<br>"URL":"http://...",<br>",," |
| content_service_classes | List of service classes used by middleware 468 to look for services for the device group. |
| config_file_version_num | DSSL configuration file version number. DSSL client 232 compares this to the version number of the DSSL config file. |

FIG. 12

```html
<!DOCTYPE html>
<html>
 <head>
  <title>Women's Day Bus Shelter Demo</title>
  <meta screen-orientation="reversePortrait" screen-long="1920" screen-short="1080"> </meta>
  <script>
        console.log("Screen is = " + screen.width + "x" + screen.height);
  </script>

<style>
   body {
     margin: 0px;
     padding: 0px;
     background:url("Official-Portraitdemo.png") 0 0 no-repeat;
     background-size: 1080px 1920px;
     font-size: 0;
        height: 1920px;
   } widget1 {
     position: absolute;
     margin: 0px;
     padding: 0px;
     top: 0px;
     left: 0px;
   } widget2 {
     position: absolute;
     margin: 0px;
     padding: 0px;
     top: 770px;
     left: 0px;
   }

</style>
 </head>

<body >
     <video id="widget1" src="widget:///Widget1" width="1080" height="609"></video>
     <div id="widget2" data-src="widget:///Widget2" width="1080" height="1147" data-interval="10000"></div>
  </body>
</html>
```

FIG. 13

```
{
    "version": "1",
    "name": "BR Bus Shelter",
    "desc": "Basking Ridge Bus Shelter",
    "updated": 1479238440000,
    "Widgets": [
        {
            "id": 1,
            "name": "Widget1",
            "manifest_mimetype": "application\/x-manifest-json",
            "type": "media",
            "fallback_id": 3
        },
        {
            "id": 2,
            "name": "Widget2",
            "manifest_mimetype": "application\/x-manifest-json",
            "type": "media"
        },
        {
            "id": 3,
            "name": "Widget3",
            "manifest_mimetype": "application\/x-manifest-json",
            "type": "media",
            "preserve_state": true
        }
    ]
}
```

```
{
    "customer_id": "customerA",
    "updated": 1476202654000,
    "version": "2",
    "Widgets": [
        {
            "id": 100,
            "name": "WidgetTop",
            "type": "media",
            "manifest_mimetype": "application\/x-manifest-json",
            "preserve_state": true,
            "full_manifest": true
        },
        {
            "id": 200,
            "name": "WidgetStat",
            "type": "media",
            "manifest_mimetype": "application\/x-manifest-json",
            "full_manifest": true,
            "selector": {
                "widget_id": 100,
                "offset": 0
            }
        }
    ]
}
```

FIG. 14B

```
{
    "customer_id": "customerA",
    "updated": 1476202654000,
    "version": "1",
    "resources": [
        {
            "id": 1001,
            "filename": "videoA.mp4",
            "mimetype": "video\/mp4"
        },
        {
            "id": 1002,
            "filename": "videoB.mp4",
            "mimetype": "video\/mp4"
        }
    ]
}
```
⬋ 1430

```
{
    "customer_id": "customerA",
    "updated": 1476202654000,
    "version": "1",
    "resources": [
        {
            "id": 1,
            "filename": "image1.jpg",
            "mimetype": "image\/jpeg",
            "selector_id": 1001
        },
        {
            "id": 2,
            "filename": "image2.jpg",
            "mimetype": "image\/jpeg",
            "selector_id": 1002
        }
    ]
}
```
⬋ 1440

| PROPERTY | DESCRIPTION |
| --- | --- |
| event_code | 1001 for successful multicast file download event<br><br>1002 for successful unicast file download event<br><br>1003 for unsuccessful multicast file download event<br><br>1004 for unsuccessful unicast file download event |
| deviceID | IMEI of the device |
| Timestamp | Epoch time in milliseconds the content package was received or failed. |
| service_ID | Service ID of content package file download (if multicast was used otherwise 0) |
| unicastURL | Unicast URL of the content package on the server |
| Filename | Name of the content package file name |
| totalBytes | Size of the file in number of bytes |

| PROPERTY | DESCRIPTION |
|---|---|
| event_code | 1010 : Content package processing event |
| deviceID | IMEI of the device |
| Timestamp | Epoch time in milliseconds the content package was received by the Caching Service. |
| widgetID | Widget ID |
| number_of_resources | Number of resources received for this widget. |
| multicast | True if the content package was successfully received over multicast. |

FIG. 18

| PROPERTY | DESCRIPTION |
|---|---|
| event_code | 1101 : Streaming video metrics event |
| deviceID | IMEI of the device |
| service_ID | Service ID of streaming video |
| unicastURL | Unicast URL of the streaming video on the server |
| widgetID | Widget ID |
| resourceID | Resource ID |
| startSegment | Identifier of the starting segment |
| endSegment | Identifier of the ending segment |
| totalBytes | Total number of bytes received over multicast and unicast combined |
| multicastBytes | Number of bytes received over multicast |
| unicastBytes | Number of bytes received over unicast |

| PROPERTY | DESCRIPTION |
|---|---|
| event_code | 1201 : ProofOfPlay Start Display event |
|  | 1202: ProofOfPlay Stop Display event |
| resourceID | Resource ID |
| widgetID | Widget ID |
| Mimetype | Mimetype of the resource |
| timestamp | Epoch time the resource was started or stopped depending on the event code |

| PROPERTY | DESCRIPTION |
| --- | --- |
| event_code | 1203 : ProofOfPlay hourly report |
| deviceID | IMEI of the device |
| resources[] | Array of resource data for proof of play |
| resourceID | Resource ID |
| widgetID | Widget ID |
| Mimetype | Mimetype of the resource |
| startTime | Epoch time the asset was displayed |
| stopTime | Epoch time the asset stopped being displayed |

| PROPERTY | DESCRIPTION |
| --- | --- |
| event_code | 1301 : Media Player 446 resource error report |
| deviceID | IMEI of the device |
| Resource | URI of resource |
| Quarantined | True if the resource file was quarantined by metrics module 480 because one error category exceeded its threshold |
| openTime | Epoch timestamp for Open event |
| startTime | Epoch timestamp for Start event |
| playTime | Epoch timestamp for Playing event |
| endTime | Epoch timestamp for End event |
| failCount | Number of Fail events received |
| codecErrCount | Number of Codec Error events received |
| frameDropCount | Number of Frame Drop events received |
| failInfo | Array of strings containing Fail events detailed info |
| codecErrInfo | Array of strings containing Codec Error events detailed info |
| frameDropInfo | Array of strings containing Frame Drop events detailed info |

| PROPERTY | DESCRIPTION |
| --- | --- |
| customer_ID | The 'customer_id' property specifies the customer (platform tenant) that published these rules. |
| device_groups | The 'device_groups' property specifies the device group(s) to which these rules are targeted. |
| Version | The 'version' property is a string identifier for the current version of the rules document (schema). |
| updated | The 'updated' property is a timestamp specifying the date and time at which the rules document was generated. |
| Widgets | The 'Widgets' property is an array of objects, where each object describes one content source (widget). |
| Widgets[].id | The 'id' property is a locally unique numeric identifier for the widget. This identifier should be unique amongst all the widgets in the rules document. |
| Widgets[].name | The 'name' property is the identifier of the content source widget i.e. the widget from which content resources should be selected. |
| Widgets[].type | The 'type' property is the type of the content source this widget represents. |
| Widgets[].manifest_mimetype | The 'manifest_mimetype' property is the Internet media type of this widget's manifest. |

| PROPERTY | DESCRIPTION |
|---|---|
| Widgets[].full_manifest | The 'full_manifest' property is a boolean flag indicating whether the widget manifest represents a complete manifest or only a partial one. Value 'true' tells the client to remove all existing widget resources before inserting the current package's resources into the cache. Value 'false' tells the client to preserve any existing widget resources when inserting the current package's resources into the cache. |
| Widgets[].preserve_state | The 'preserve_state' property is a boolean flag indicating whether the presentation state of this widget should be preserved in case another widget becomes the current content source. |
| Widgets[].fallback_ID | The 'fallback_id' property is the identifier of the next widget to "fall back" to in case no resources are available for this widget. |
| Widgets[].selector | The 'selector' property indicates that this widget's resource selection depends upon another widget. |
| Widgets[].selector.widget_ID | The 'widget_id' property is the identifier of the widget that will determine content selection for this widget. The widget identified by this property is known as the selecting widget. |
| Widgets[].selector.offset | The 'offset' property indicates an offset from the current resource in the selecting widget. The value '0' is the current resource, the value '1' is the next resource, and the value '-1' is the previous resource. |

| PROPERTY | DESCRIPTION |
|---|---|
| customer_id | The 'customer_id' property specifies the customer (platform tenant) that published this content. |
| device_groups | The 'device_groups' property specifies the device group(s) to which this content is targeted. |
| Version | The 'version' property is a string identifier for the current version of the manifest schema. |
| Updated | The 'updated' property is a timestamp specifying the date and time at which the manifest was generated. The timestamp format is the number of milliseconds since Jan 1, 1970 00:00:00 GMT. |
| Resources | The 'resources' property is an array of objects, where each object describes one resource. |
| resources[].id | The 'id' property is a unique numeric identifier for the resource. This identifier should be unique amongst all resources for this widget. |
| resources[].filename | The 'filename' property is the name of the file containing the resource's content. |
| resources[].mimetype | The 'mimetype' property is the Internet media type of the resource file. |
| resources[].selector_id | The 'selector_id' property is the numeric identifier of a content resource in another widget to which this resource is linked. This property is used in conjunction with a content dependency business rule. |

| PROPERTY | DESCRIPTION |
| --- | --- |
| Version | The 'version' property is a string identifier for the current version of the manifest. |
| Updated | The 'updated' property is a timestamp specifying the date and time at which the manifest was generated. |
| customer_ID | The 'customer_id' property specifies the customer (platform tenant) that published this content.(Optional) |
| device_groups | The 'device_groups' property specifies the device group(s) to which this content is targeted. |
| widget | The 'widget' property is a string identifier for the widget to which this Content Package belongs. |
| cache | The 'cache' property defines how the Caching Service should handle the cache for the sign template, manifest files and each widget resource file. When the cache property appears in the root manifest.json file and is set to "new" the template and all resources for all widgets are new so the old root files, manifest files and all resource files can be deleted from the cache. When the cache property appears in the root manifest file and is set to "update" then the Caching Service reads each widget manifest file to see if the cache property appears there. When the cache property appears in a widget manifest file and is set to "update" the Caching Service compares the resource list in the widget.json file to the widget resources in the cache and delete those widget resources from the cache that do not appear in the widget.json file. When the cache property appears in the widget manifest file and is set to "new" then all resource files and manifest files (i.e., manifest.json and widget.json) will be replaced with the files received in the content package. |

| PROPERTY | DESCRIPTION |
| --- | --- |
| resources | The 'resources' property is an array of objects, where each object describes one content file. |
| resources[].id | The 'id' property is a integer identifier for the resource. This identifier must be unique amongst all resources in this widget. |
| resources[].url | The 'url' property is a relative URL which identifies the file. |
| resources[].availability_schedule | The 'availability_schedule' indicates the time interval during which the resource file is available for retrieval by the client application. The property is an array of schedule objects. |
| resources[].availability_schedule[].start_time | The 'start_time' property specifies the time at which the resource is first available to the client application. |
| resources[].availability_schedule[].duration | The 'duration' property specifies the length of the time the resource is available to the client application. |
| tesources[].mimetype | The 'mimetype' property is the Internet media type of the resource file. |
| resources[].md5 | The 'md5' property is the MD5 cryptographic hash of the resource file. |

DIGITAL SIGNAGE SHIM LAYER

BACKGROUND

A digital signage system includes digital signage (e.g., a collection of commercial or public digital display signs) and a content management system. The content management system schedules and generates content and delivers the content to the digital displays at appropriate times.

BRIEF DESCRIPTION OF THE DRAWINGS

FIG. 5 illustrates an exemplary DSSL configuration file;

FIG. 7 illustrates an exemplary session configuration file;

FIG. 12 illustrates an exemplary template that the DSSL of FIG. 4 may display;

FIG. 13 illustrates an exemplary business rules file for the business logic of FIG. 4;

FIG. 14A illustrates an exemplary business rules file in which displaying one widget depends on displaying another widget;

FIG. 14B illustrates two exemplary files that provide for dependency between resources when displaying widgets;

FIG. 16 illustrates an exemplary schema for data, which the service continuity module (SCM) of FIG. 4 may send to the metrics module of FIG. 4 and which may be used for content package metrics;

FIG. 17 illustrates an exemplary schema for data, which may be sent from the caching service of FIG. 4 to the metrics module of FIG. 4 and which may be used for content package metrics;

FIG. 18 illustrates an exemplary schema for data, which may be sent from the SCM of FIG. 4 to the metrics module of FIG. 4 and which may be used for multimedia metrics;

FIG. 19 illustrates an exemplary schema for data, which is forwarded from the caching service of FIG. 4 to the metrics module of FIG. 4, and which may be used for proof-of-play;

FIG. 20 illustrates an exemplary schema for data, which indicates proof-of-play and which may be sent from the metrics module of FIG. 4 to the Digital Signage Management System (DSMS) of FIG. 2;

FIG. 21 illustrates an exemplary list of parameters that the media player of FIG. 4 may send to the metrics module of FIG. 4 regarding multimedia health;

FIGS. 24A and 24B illustrate an exemplary business rules manifest schema;

FIG. 25 illustrates an exemplary widget manifest schema; and

FIGS. 26A and 26B illustrate an exemplary content package manifest schema.

DETAILED DESCRIPTION OF PREFERRED EMBODIMENTS

The following detailed description refers to the accompanying drawings. The same reference numbers in different drawings may identify the same or similar elements.

A digital signage management system (DSMS) is a server component that may function as a content management system (e.g., portal) enabling delivery of customer content to digital signage applications. The DSMS may also function as a Device Management System (DMS) and a Digital Signage Delivery System (DSDS), capable of using multicast or unicast where appropriate for achieving an effective end-to-end content delivery solution.

A digital signage device (also herein referred to as "host device") may receive digital content from the DSMS and render the content for display on any screens, including those capable of High Definition Multimedia Input (HDMI). The digital signage device is capable of both unicast and multicast reception over a network (e.g., a wireless network). The Digital Signage Shim Layer (DSSL) is the main component of the digital signage device.

Figure 1:
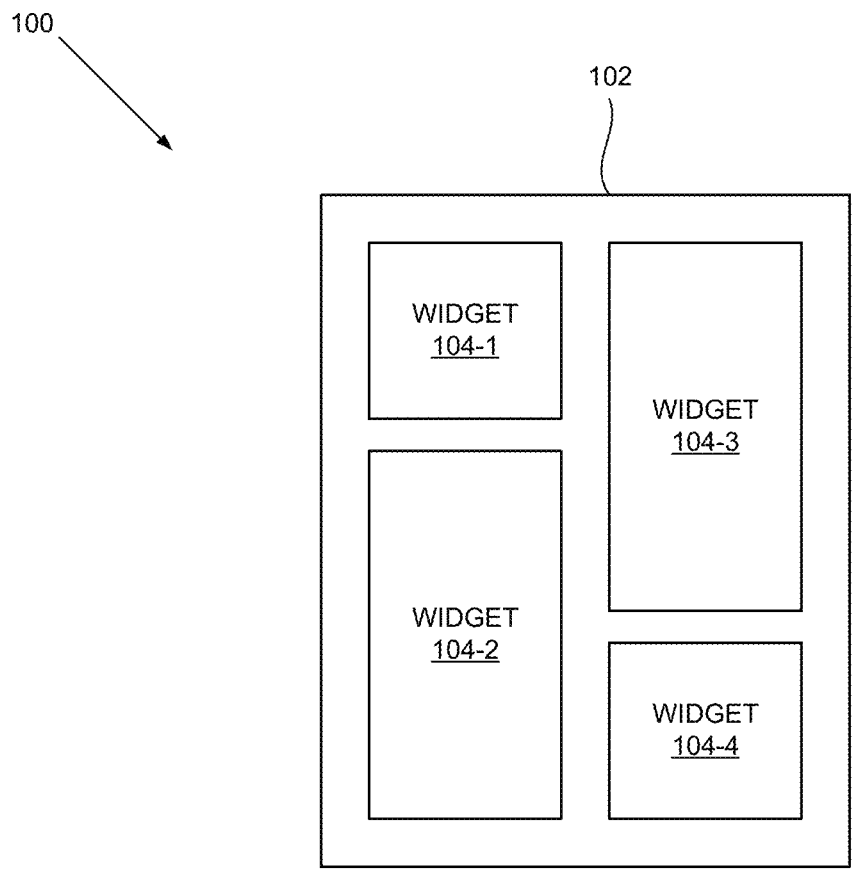
FIG. 1 illustrates the concepts described herein.

FIG. 1 illustrates one of the concepts described herein. As shown, the concept 100 includes a template 102 and widgets 104-1 through 104-4 (herein collectively referred to as "widgets 104" and generically as "widget 104"). Depending on the implementation, template 102 may include fewer or additional widgets than those illustrated in FIG. 1. In addition, widgets may have different sizes and shapes than those in FIG. 1.

Template 102 may include a document written in a specific language (e.g., Hypertext markup language (HTML) of different versions, such as HTML 5.0). The document specifies what content items are to be displayed on a particular digital signage device. As shown, template 102 may be configured to have widgets 104. Template 102 may define how many widgets there are on the sign and the relative size and location of each widget 104. For example, in FIG. 1, template 102 defines a sign in the portrait orientation with four widgets 104.

Each widget 104 has a defined area (i.e., rectangular area as illustrated) and includes a collection of resources for display. Each of the resources can be a still image, an audio file, a text file, a video file, a streaming video, or another type of data. Each widget 104 may contain a separate set of resources, although one or more of the resources may be identical to those in other widgets 104. Each resource is displayed (or played, in case of audio/video resource) inside its widget 104 on the sign, and is displayed in a predefined order according to the widget 104's playlist.

In some implementations, each of template 102 and widgets 104 may be configured and stored as a compressed folder/directory (e.g., a file in the ZIP format), where template 102 is a root. In these implementations, template 102 may include: a static image that acts as a backdrop for the sign; a rules file (e.g., JavaScript Object Notation (JSON) file) indicating the number of widgets 104; and a document (e.g. HTML 5 document) that contains information about the sign (e.g., the orientation of the sign, locations of widgets 104, etc.). Each of widgets 104 may include a manifest file (e.g., JSON file) describing the widget and its resources); a widget file (e.g., JSON file) defining widget 104's playlist; and widget 104's resources.

All of template 102 and widgets 104 may be sent from a DSMS to a digital signage device as a zipped file (herein referred to as "content package") for processing and displaying the sign.

Figure 2:
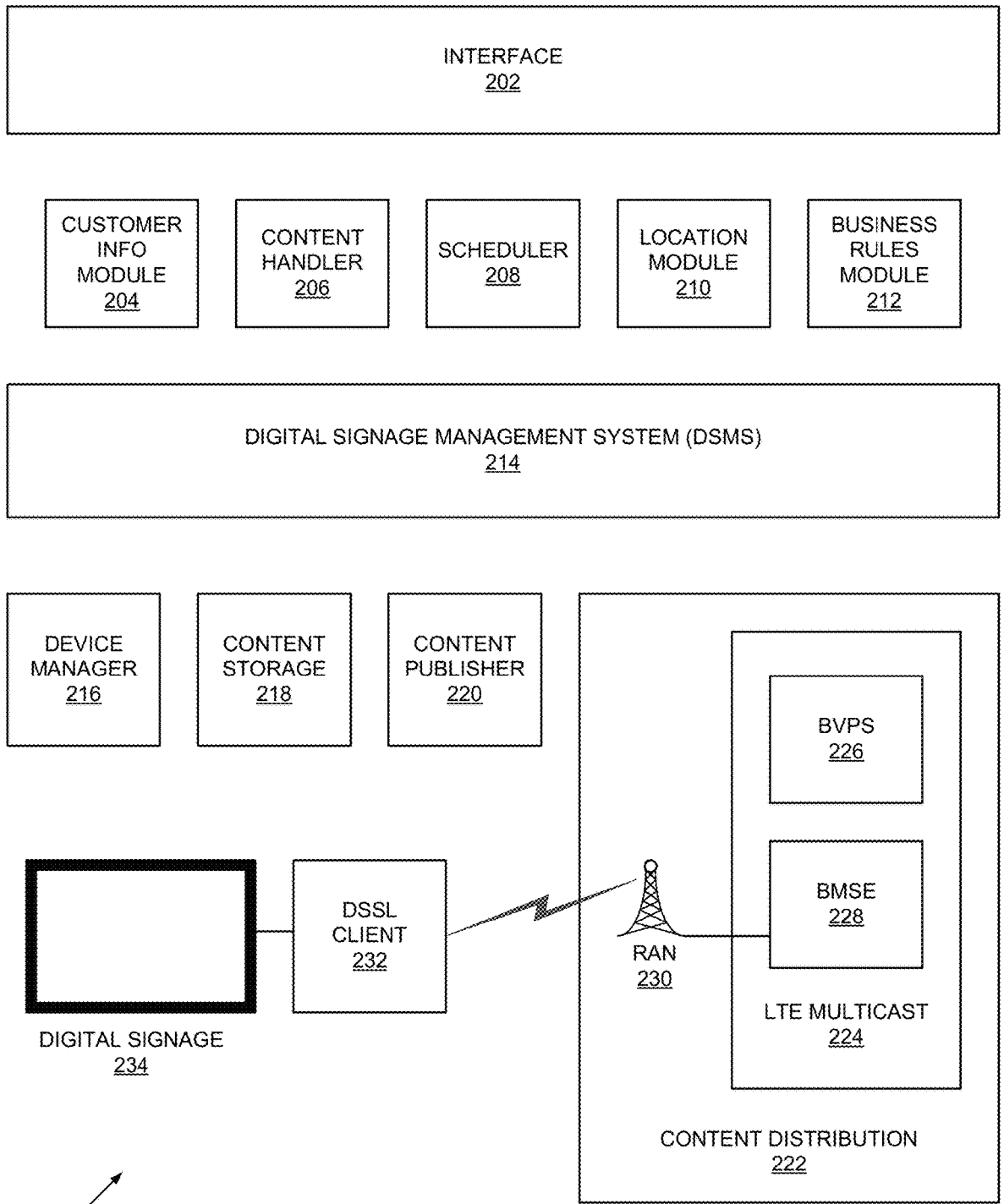
FIG. 2 illustrates an exemplary environment in which the concepts described herein may be implemented.

FIG. 2 illustrates an exemplary environment 200 in which concepts described herein may be implemented. Environment 200 may be implemented as one or more networks capable of exchanging digital analog data, such as voice, video, documents, multimedia, text, etc. For example, the networks may include one or more public switched telephone networks (PSTNs), one or more wireless public land mobile networks (PLMNs), or another types of networks.

The PLMN(s) may include a Code Division Multiple Access (CDMA) 2000 PLMN, Global System for Mobile Communications (GSM) PLMN, Long Term Evolution (LTE) PLMN and/or other types of PLMNs not specifically described herein. The network may include Packet data network (PDN) that supports Internet Protocol (IP)-based communications. The PDN may include, for example, an IP Multimedia Subsystem (IMS) network, which may provide voice and multimedia services to user devices based on Session Initiation Protocol (SIP).

Environment 200 may also include networks with a number of transmission towers for receiving wireless signals and forwarding the signals toward the intended destination. The networks may further include one or more packet switched networks, such as a local area network (LAN), a wide area network (WAN), a personal area network (PAN), an intranet, the Internet, or another type of network that is capable of exchanging information.

As shown, environment 200 may include an interface 202, customer information module 204, content handler 206, scheduler 208, location module 210, business rules module 212, DSMS 214, device manager 216, content storage 218, content publisher 220, content distribution system 222, DSSL client 232, and digital signage 234. Interface 202 may allow customers (e.g., those whose content is displayed for fee) to input to and receive from customer information module 204, content handler 206, scheduler 208, location module 210, business rules module 212, and DSMS 214. In one implementation, interface 202 may include a web interface. Alternatively or additionally, interface 202 may comprise hardware or standalone client software.

Customer information module 204 may receive customer information from customers via interface 202, store the information (e.g., in a database), permit the customers to update the information, and access the information on behalf of another component (e.g., DSMS 214, interface 220, etc.). The customer information may include security information (e.g., password, user id, etc.), billing information, user preferences related to interface 202, etc.

Content handler 206 may receive, store, and access information on behalf of another component (e.g., interfaced 202, DSMS 214, etc.). For example, content handler 206 may store content uploaded by customers at proper locations, register the content, track the amount of content the user has uploaded, etc. Scheduler 208 may receive, from another component (e.g., interface 202), a specified schedule for outputting a particular resource for a widget. Scheduler 208 may store and access the schedule when requested by another component (e.g., DSMS 214, interface 202, etc.).

Location module 210 may allow a customer to select, via interface 202, particular signage or signs at particular locations, for displaying specific content. To accomplish the location tracking function, location module 210 may track what display devices are located where, their IP addresses (or another identifier for the device, etc.), etc. Business rules module 212 may receive business rules, from customers via interface 202, for displaying particular content. In addition, business rules module 212 may store and access the business rules on behalf of another component (e.g., DSMS 214).

DSMS 214 may integrate customer information, specified content, schedules, location information, and business rules to generate content packages, store and/or publish the packages. DSMS 214 may enable delivery of content to host devices.

Device manager 216 may specify, store, and retrieve device parameters and their states on behalf of another component. For example, device manager 216 may receive error reports from host devices. Device manager 216 may use such information to determine which device has failed, send notifications to administrators, etc.

Content storage 218 may store and/or access the content uploaded by customers and its metadata at specific devices (e.g., content distribution network devices) for distribution. The metadata may have been generated by content publisher 220 when DSMS 214 decides to publish a specific content item.

When DSMS 214 sends a particular content item to DSSL client 232, DSMS 214 uses content distribution system 222. Content distribution system 222 includes an LTE multicast system 224, which may send content items to DSSL client 232 via a radio access network 230. LTE multicast system 224 may include broadcast video provisioning system (BVPS) 226 for providing video/streams and broadcast multicast service center (BMSC) 228 for multicasting video/streams, where appropriate. In other implementations, the content may be delivered over a cable, fiber, or another type of media.

DSSL client 232 may receive content from RAN 230 over wireless links (either multicast or unicast (not shown)) and display the content via digital signage 234. In some implementations, DSSL client 232 may receive content via a wireline links. Digital signage 234 may include one or more digital signs that are coupled to DSSL client 232. Digital signage 234 may display content sent from DSSL client 232.

While FIG. 2 shows exemplary components of environment 200, in other implementations, environment 200 may include fewer components, different components, differently arranged components, or additional components than depicted in FIG. 2. Additionally, or alternatively, one or more components in environment 200 may perform functions described as being performed by one or more other components.

Figure 3:
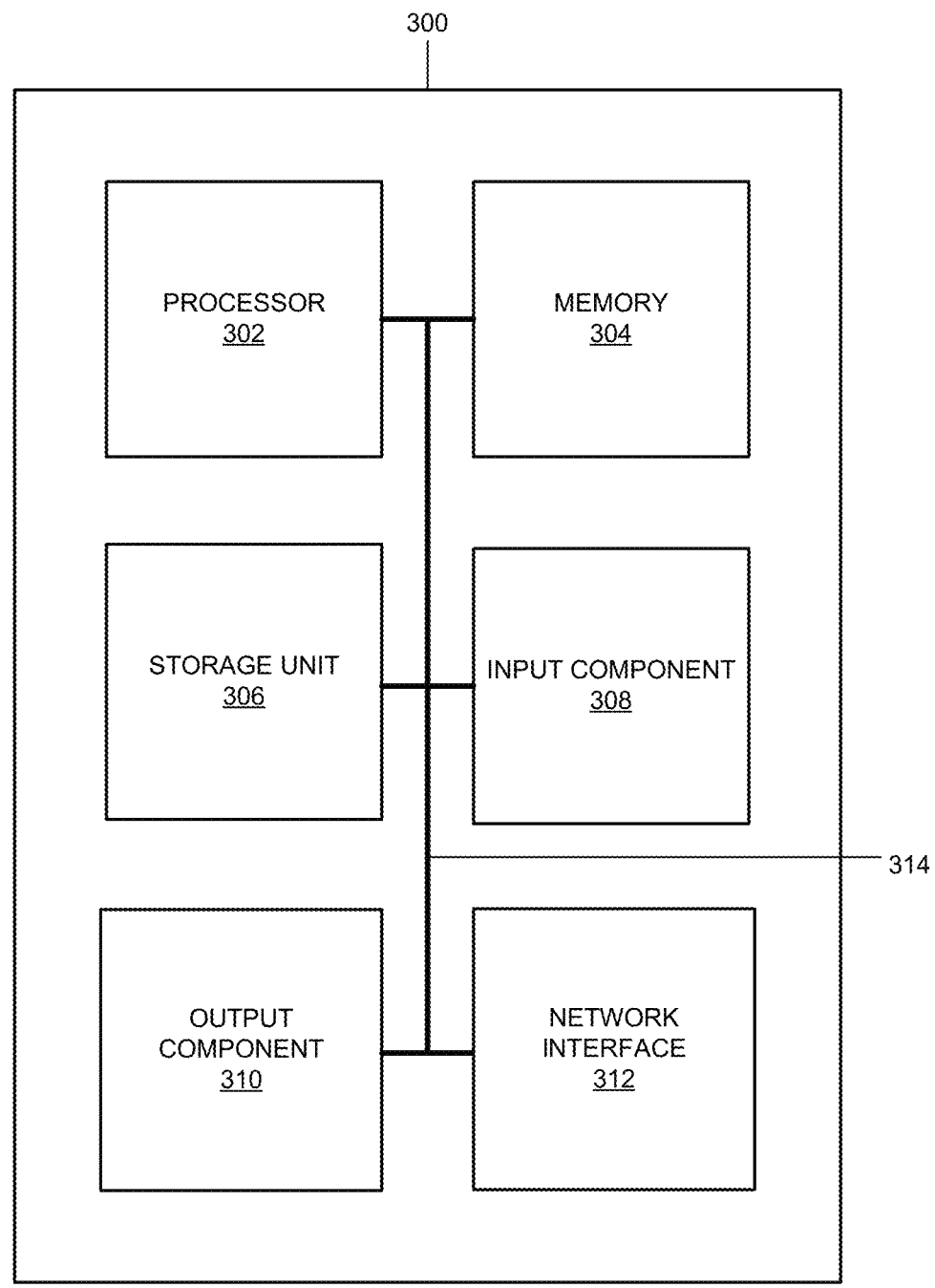
FIG. 3 illustrates exemplary components of the network devices of FIGS. 1 and 2.

FIG. 3 is a block diagram of exemplary components of a network device 300. Network device 300 may be included in any of the devices and/or components illustrated in FIG. FIG. 2. For example, components 202-234 may include one or more network devices 300.

As shown, network device 300 may include a processor 302, memory 304, storage unit 306, input component 308, output component 310, network interface 312, and communication path 314. In different implementations, network device 300 may include additional, fewer, different, or different arrangement of components than the ones illustrated in FIG. 3. For example, network device 300 may include line cards, modems, etc.

Processor 302 may include a processor, a microprocessor, an Application Specific Integrated Circuit (ASIC), a Field Programmable Gate Array (FPGA), programmable logic device, chipset, application specific instruction-set processor (ASIP), system-on-chip (SoC), central processing unit (CPU) (e.g., one or multiple cores), microcontrollers, and/or other processing logic (e.g., embedded devices) capable of controlling device 300 and/or executing programs/instructions.

Memory 304 may include static memory, such as read only memory (ROM), and/or dynamic memory, such as random access memory (RAM), or onboard cache, for storing data and machine-readable instructions (e.g., programs, scripts, etc.).

Storage unit 306 may include a floppy disk, CD ROM, CD read/write (R/W) disk, optical disk, magnetic disk, solid state disk, holographic versatile disk (HVD), digital versatile disk (DVD), and/or flash memory, as well as other types of storage device (e.g., Micro-Electromechanical system (MEMS)-based storage medium) for storing data and/or machine-readable instructions (e.g., a program, script, etc.). Storage unit 306 may be external to and/or removable from network device 300. Storage unit 306 may include, for example, a Universal Serial Bus (USB) memory stick, a dongle, a hard disk, off-line storage, a Blu-Ray® disk (BD), etc. Storage unit 306 may store data, a copy of software, an operating system, application, and/or instructions.

Depending on the context, the term "memory," "storage," "storage device," "storage unit," and/or "medium" may be used interchangeably. For example, a "computer-readable storage device" or "computer-readable medium" may refer to both a memory and/or storage device. Furthermore, in some implementations, device 300 may include non-volatile storage device that also operates as memory (e.g., Intel's Optane™).

Input component 308 and output component 310 may provide input and output from/to a user to/from device 300. Input/output components 308 and 310 may include a display screen, a keyboard, a mouse, a speaker, a microphone, a camera, a DVD reader, USB lines, and/or other types of components for obtaining, from physical events or phenomena, to and/or from signals that pertain to device 300.

Network interface 312 may include a transceiver (e.g., a transmitter and a receiver) for network device 300 to communicate with other devices and/or systems. For example, via network interface 312, network device 300 may communicate over a network, such as the Internet, an intranet, a terrestrial wireless network (e.g., a WLAN, WiFi, WiMax, etc.), a satellite-based network, optical network, etc. Network interface 312 may include a modem, an Ethernet interface to a LAN, and/or an interface/connection for connecting device 300 to other devices (e.g., a Bluetooth® interface).

Communication path 314 may provide an interface through which components of device 200 can communicate with one another.

Network device 300 may perform the operations described herein in response to processor 302 executing software instructions stored in a non-transient computer-readable medium, such as memory 304 or storage device 306. The software instructions may be read into memory 304 from another computer-readable medium or from another device via network interface 312. The software instructions stored in memory 304 or storage device 306, when executed by processor 302, may cause processor 302 to perform processes that are described herein.

For example, DSSL client 232 may include network devices 300 (or is implemented over network devices 300). In such instances, the programs on DSSL client 232 may receive content from DSMS 214 over multicast. In another example, DSSL client 232 may cache the received content for display.

Figure 4:
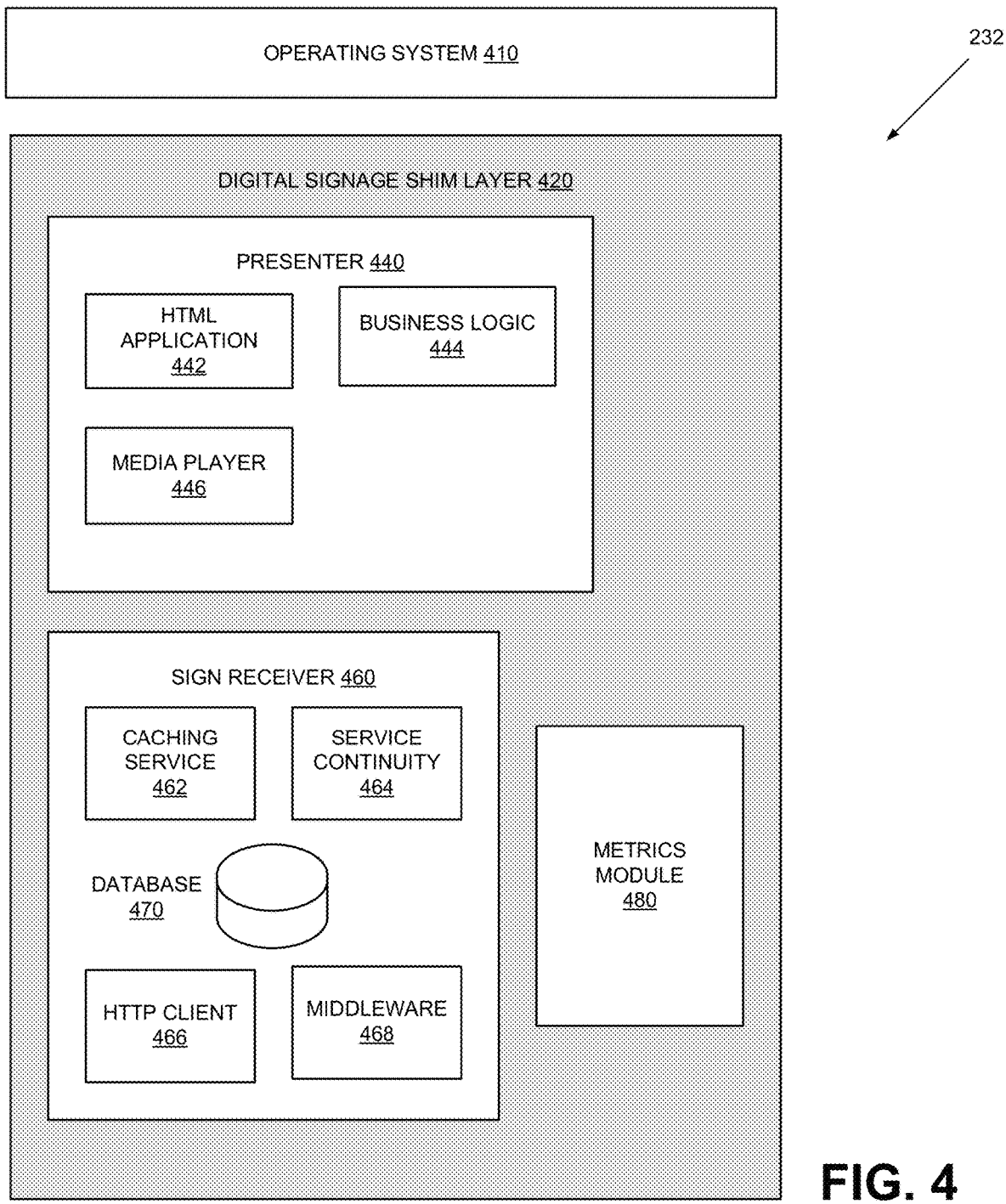
FIG. 4 illustrates exemplary functional components of an exemplary digital signage shim layer (DSSL) client.

FIG. 4 illustrates exemplary functional components of DSSL client 232. As shown, DSSL client 232 may include an operating system 410 and a digital signage shim layer (DSSL) 420. Depending on the implementation, DSSL client 232 may include additional applications (not shown).

Operating system 410 may manage computing resources of DSSL client 232. For example, operating system may perform memory management, multi-process/thread scheduling, storage management, etc. Operating system 410 may include, for example, Linux, Windows, Android, etc.

DSSL 420 is a collection of software components/modules. According to some implementations, DSSL 420 may be configured in accordance with a DSSL configuration file. FIG. 5 illustrates an exemplary DSSL configuration file 500 for such implementations. As illustrated, configuration file 500 includes a number of parameters. FIG. 5 also illustrates, for each parameter, its use by DSSL 420. Depending on the implementation, DSSL configuration file 500 may include additional, fewer, or different parameters than those illustrated in FIG. 5.

Figure 6:
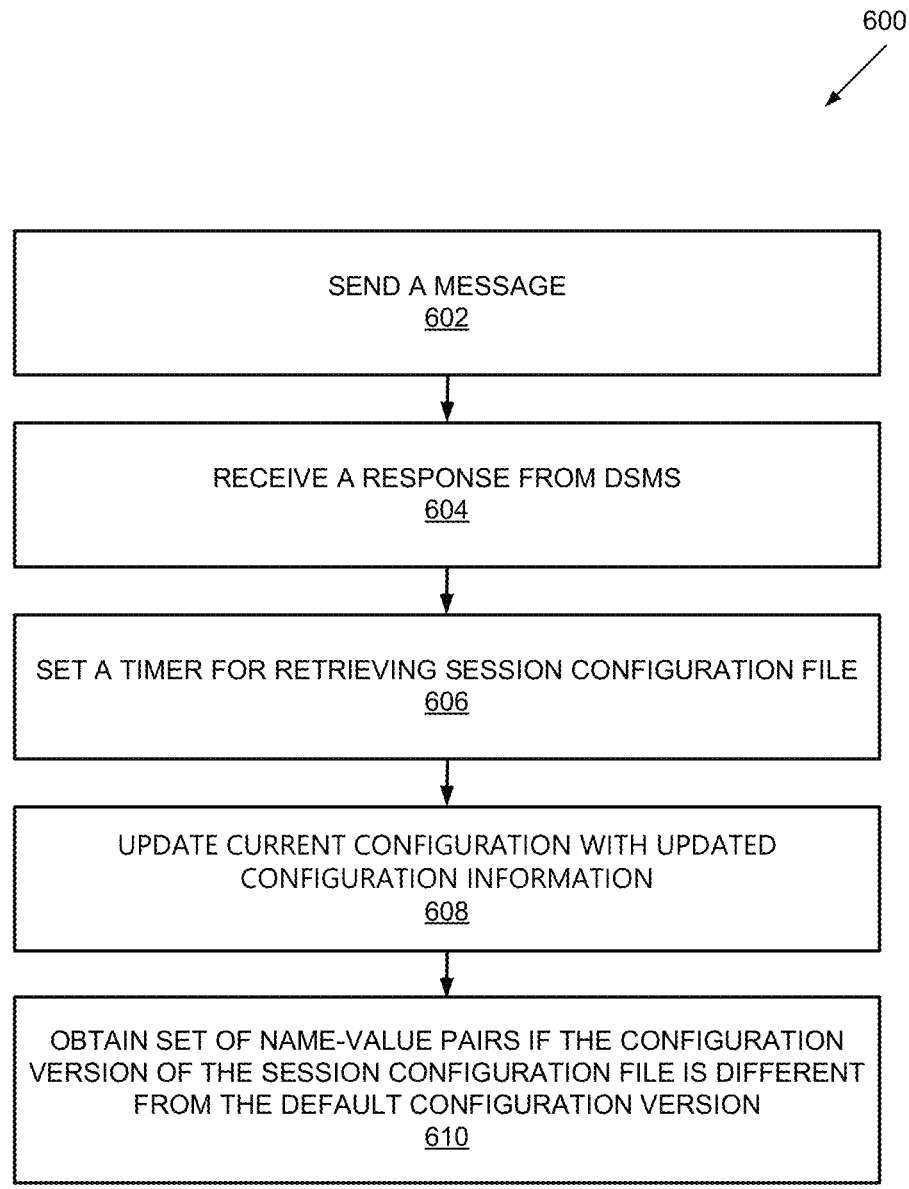
FIG. 6 illustrates exemplary actions that the DSSL of FIG. 4 my perform.

FIG. 6 illustrates exemplary actions 600 that DSSL 420 may perform according to some implementations. As shown, on power up, DSSL 420 may retrieve a session configuration file from DSMS 214. FIG. 7 illustrates an exemplary session configuration file 700.

To retrieve session configuration file 700, DSSL 420 may send a message *e.g., an HTTP POST message) to DSMS 214 (block 602). In one implementation, the body of the message may be set to "IMEI":"<device IMEI>" where <device IMEI> contains the IMEI of the device hosting DSSL 420 ("host device"). In a different implementation, instead of IMEI, another identifier (e.g., an identifier for DSSL client 232 (or its subcomponent) or another type of hardware identifier).

The message may be sent to a Representational state transfer-ful (RESTful) interface at DSMS 214. As shown in FIG. 5, the address of the interface is provided by parameter REST_API_URL in configuration file 500.

DSSL 420 may receive a response from DSMS 214 (block 604). In one implementation, if there is no available content package, the response may be an HTTP 204 message. If there is an available content package, DSMS 214 may respond with a set of name-value pairs. When DSMS 214 sends the pairs in unicast, the pairs may be in the form of "unicast_content_pkg":[array parameter value 1", "array parameter value 2" . . . ]. DSSL 420 may save the values in memory, as the current set of values, for session configuration file 700.

DSSL 420 may set a timer to (e.g., to a value specified by session_config_polling_interval in configuration file 500) (block 606). When the timer expires, DSSL 420 may return to block 602 and then proceed to block 604, to retrieve a new session configuration file.

For each session configuration file that DSSL 420 receives, DSSL 420 may update the current configuration with updated configuration information (block 608).

In one implementation, if the values are different, DSSL 420 may obtain a set of name-value pairs (block 610). For example, DSSL 420 may send an HTTP POST message to DSMS 214 at a URL designated by default_config_URL for a REST interface in file 500. The message may contain "IMEI:<device IMEI>", where <device IMEI>specifies the IMEI of the host device. In response, DSMS 214 may provide name-values pairs in JSON format (i.e., "parameter name":"parameter value"). Thereafter, DSSL 420 may parse the response from DSMS 214 and assign the resulting values to configuration file 500.

Returning to FIG. 4, DSSL 420 may include one or more components. As shown in FIG. 4, the components may include: presenter 440, sign receiver 460, and metrics module 480. Depending on the implementation, DSSL 420 may include additional functional components than those illustrated in FIG. 4.

Presenter 440 may include modules needed to determine how and when content should be displayed on a sign associated with the host device. For example, as shown in FIG. 4, presenter 440 may include an HTML application 442, business logic 444, and one or more of media player(s) 446.

HTML application 442 may include an HTML document (e.g., HTML 5.0 page), which may include various tagged items, as well as scripts, code, etc. A document that HTML application 442 displays on a sign may be referred to as a "template."

Business logic 444 may process widgets 104 received by another component (e.g., caching service 462). The processing may include applying business rules for displaying content at HTML application 442.

In particular, business logic 444 may access a file (e.g., rules.json file) to determine what should be displayed on the sign in certain widgets 104. For example, there could be a dependency between two widgets 104 so that when one widget 104 displays a video file for a car advertisement, another widget 104 displays still images of that car. Another condition could be a fallback widget 104 if the content for one widget 104 is not available as in the case of a live streaming video that is only displayed for a fixed period of time.

Media player 446 may play video files or streaming video on the display. For example, media player 446 may prepare audio and video content (e.g., decode) and send content segments to a digital display.

Sign receiver 460 may receive data that represents one or more signs from DSMS 214. In some implementations, the primary communication method for sign receiver 460 to receive content packages is over unicast. Sign receiver 460, however, may receive the content packages over multicast if the host device for DSSL 420 is in close proximity to another host device or is one of many host devices that are close (e.g., in an area with the same zip code or in contiguous areas with corresponding zip codes). As shown in FIG. 4, sign receiver 460 may include a caching service 462, service continuity module 464, HTTP client 466, middleware 468, and database 470. Caching service 462 may receive content packages over unicast and/or multicast. The content packages may include widgets and their resource definitions.

Service continuity module (SCM) 464 may ensure that segments are timely received from unicast and multicast sources. In one implementation, when the device hosting DSSL client 232 is within a multicast service area, Dynamic Adaptive Streaming over HTTP (DASH) content may be delivered directly from middleware 468 to SCM 464. In response, SCM 464 may relay the content to media player 446. If any DASH segments are missing from the content stream, SCM 464 may fill in the gap with identical segments received over a unicast connection.

HTTP client 466 may establish and communicate over HTTP sessions. HTTP client 466 may also remove HTTP connections after the sessions are terminated. Middleware 468 may communicate with a communication manager (e.g., a modem manager) in operating system 410, to receive multimedia multicast service (e.g., eMBMS) streaming video and/or file download content. Middleware 468 may send received streaming video directly to SCM 464 and downloaded files over multicast to caching service 462.

Database 470 may store may provide storage for any of the components of sign receiver 460. Database 470 may be implemented to have a directory structure, include structured query language (SQL) database, NoSQL, etc.

Metrics module 480 may keep track of the amounts of multicast data and/or unicast data that are displayed (e.g., in bytes, megabytes, etc.). Metrics module 480 may generate usage reports and send the reports to a server/users for customer information and for billing purposes. Additional details regarding metrics module 480 are provided below.

Figure 8:
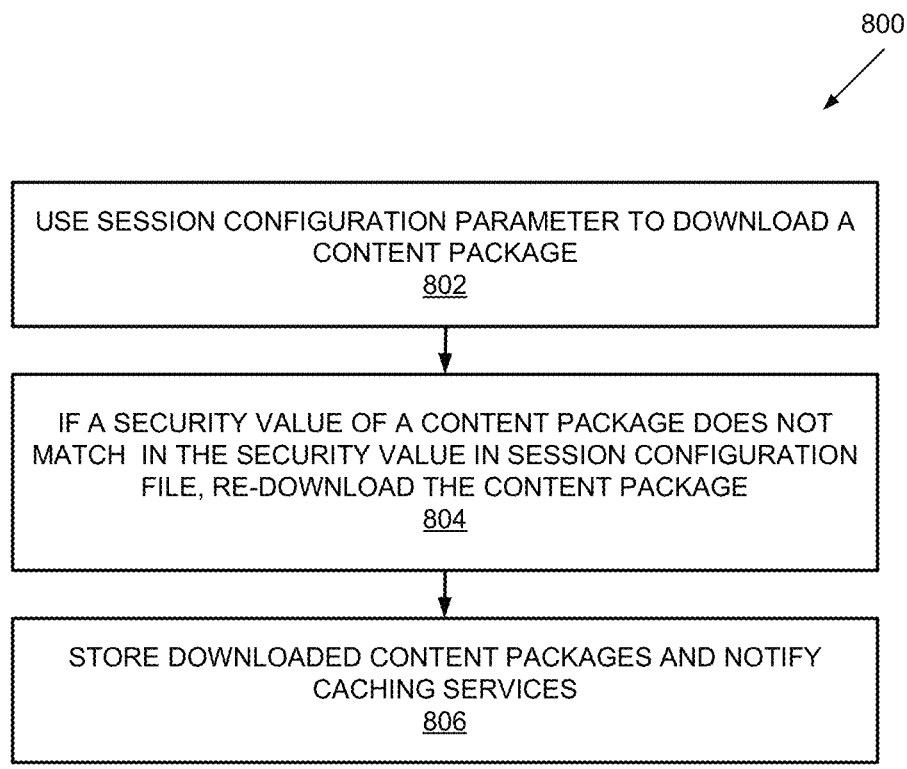
FIG. 8 illustrates an exemplary process that is associated with receiving a content package over unicast.

Components 462-468 described above communicate with one another when sign receiver 460 receives content packages over multicast or unicast. FIG. 8 illustrates a process 800 that is associated with receiving content packages over unicast. As shown, process 800 may include SCM 464 using a parameter in session configuration file 700 to download a content package (block 810). For example, SCM 464 may use a Universal Resource Locator (URL) from the content_pkg_unicast_URL array (which is included in session configuration file 700) to download content packages. In one implementation, SCM 464 may ignore the URL, however, if the MD5 value provided for a particular entry is empty.

Process 800 may further include, for each downloaded content package, SCM 464 comparing a security parameter (e.g., MD 5) value of the content package to a security parameter (e.g., MD5 content_pkg_unitcast_URL array) value provided in session configuration file 700 (block 820). For example, SCM 464 may compare the MD5 value of the content package to the corresponding value in content_pkg_unicast_URL array in session configuration file 700. If the security parameters values (e.g., MD5 values) do not match, SCM 464 may re-download the content package.

In one implementation, if SCM 464 does not receive a response from the URL in the content_pkg_unicast_URL array, SCM 464 may continue to attempt to download the content package from the same URL, until a new session configuration file is received from DSMS 214.

Process 800 may further include, after SCM 464 receives all of the content packages specified in content_pkg_unicast_URL array, SCM 464 may store the content packages via caching service 462, in memory, and notify caching service 462 that new content packages are waiting to be processed by caching service 462.

Figure 9A:
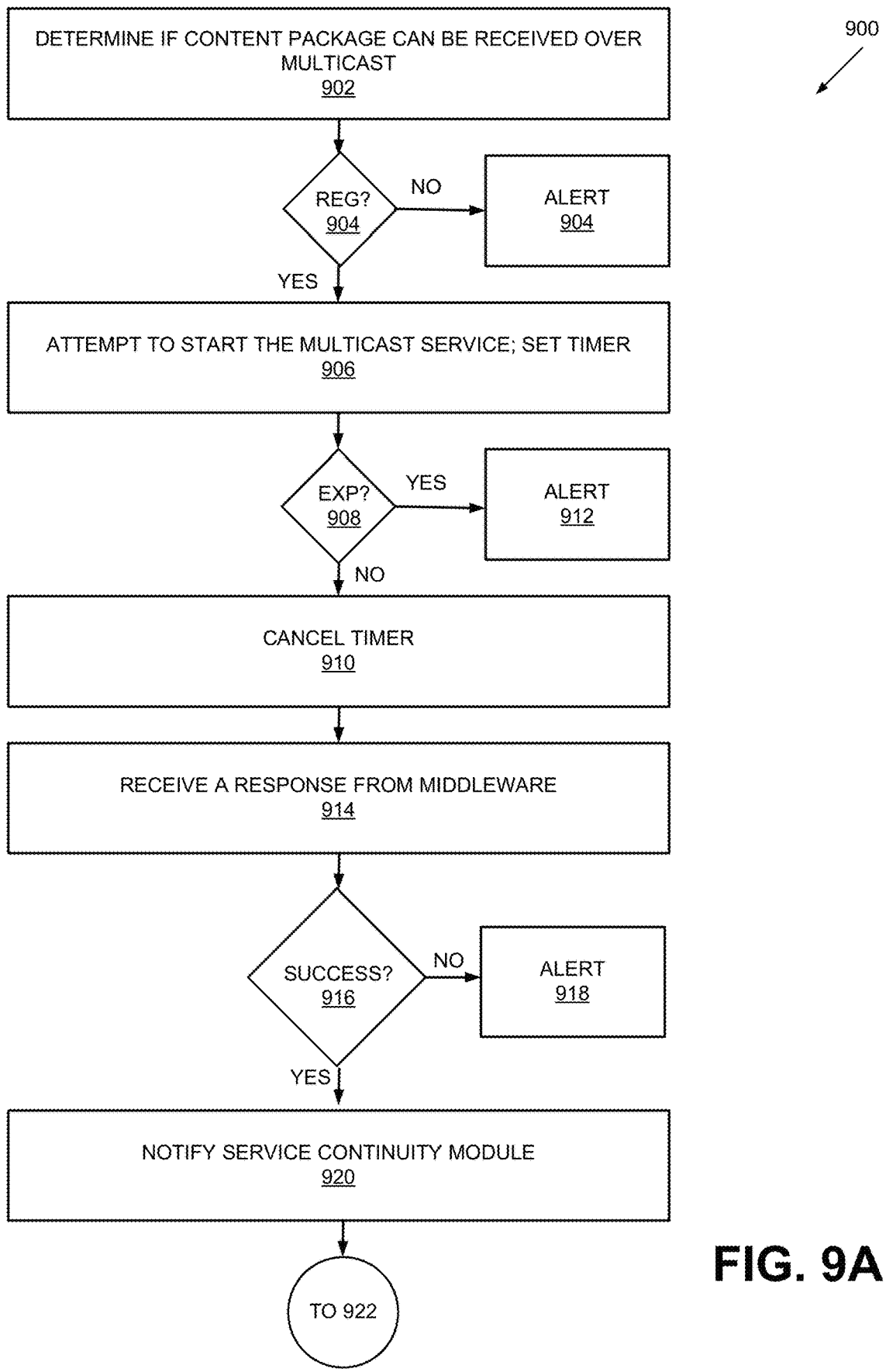
FIGS. 9A and 9B illustrate an exemplary process that is associated with receiving a content package over multicast.
Figure 9B:
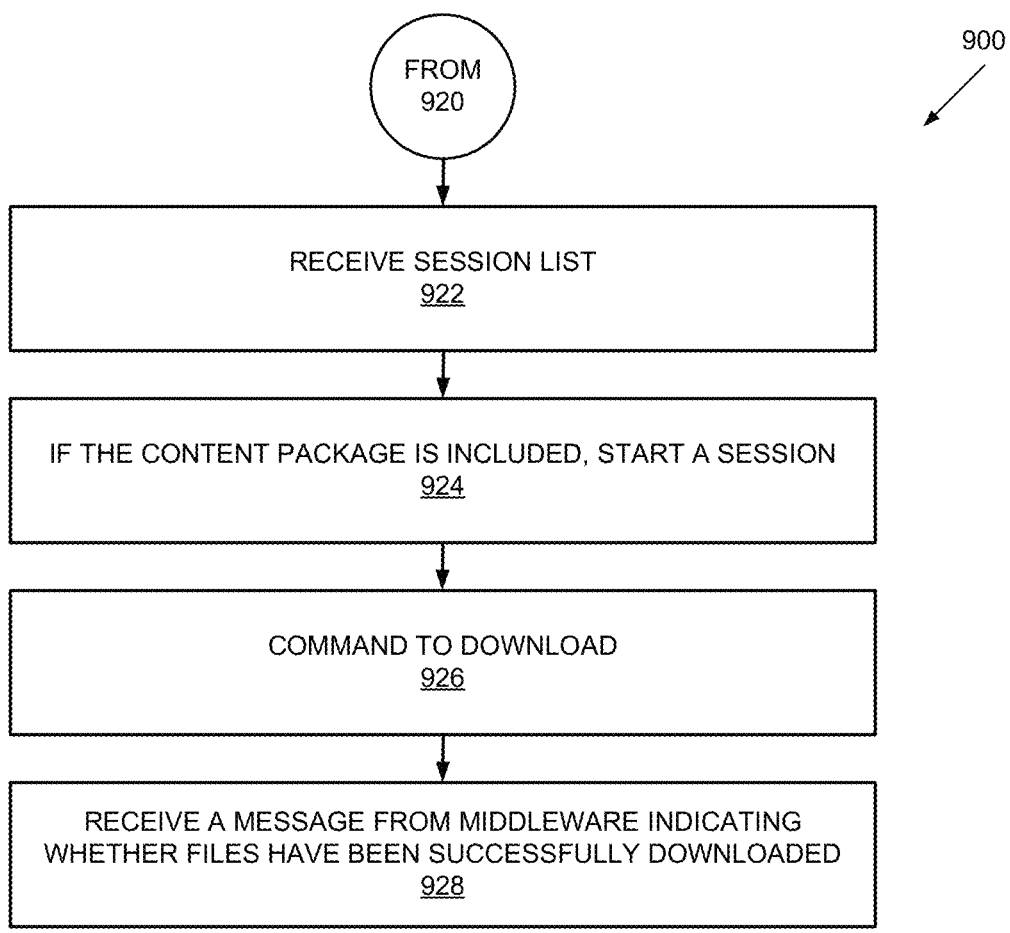

FIGS. 9A and 9B illustrate a process 900 that is associated with receiving content packages over multicast. In some implementations, SCM 464 may receive content packages over multicast through middleware 468.

As shown in FIG. 9A, process 900 may include SCM 464 determining whether content packages can be received over multicast (block 902). For example, if the content_pkg_service_ID in session configuration file 700 is not equal to a NULL string (e.g., ""), SCM 464 may receive content packages over multicast by using content_pkg_servide_ID. SCM 464 may use the URLs in the content_pkg_unicast_URL in session configuration file 700 as a backup to multicast reception of content packages if the multicast initialization or a file download over multicast fails.

To receive the content packages over multicast, SCM 464 may determine whether it can register for the multicast service (block 904). In one implementation, SCM 464 may call a registration function at middleware 468. In one implementation, the host device may need to call the function only once. In response to the call, middleware 468 may invoke a callback.

Process 900 may include determining whether the registration is successful (block 904) (e.g., a return value of the registration function is equal to a specific number, such as the zero). If so (block 904: yes), SCM 464 may request to start the multicast service and start a timer, to ensure that the service (e.g., EMBMS service) starts within a reasonable period of time (e.g., 2 minutes). When middleware 468 receives another call from SCM 464, middleware 468 may command a communications manager (e.g., via OS 410) in initiate the service. With the host powered on, SCM 464 needs to call the request to start the service only once.

If SCM 464 receives a response before the timer expires (block 908: no), SCM 464 may cancel the timer (block 910). Otherwise (block 908: yes), when the timer expires, SCM 464 may send an alert to device manager 216 indicating that DSSL 420 could not start the multicast service (e.g., eMBMS service) and it is falling back to unicast reception of the content packages (block 912).

If the registration was not successful (block 904: no), SCM 464 may send an alert to device manager 216, indicating that it could not register for EMBMS service and that SCM 464 should fall back to unicast reception of the content packages (block 906).

When middleware 468 receives the request to start the service call from SCM 464, middleware may command a communication manager (e.g., call a modem via OS 420) to initiate the eMBMS service.

Process 900 may further include middleware 468 responding to SCM 464's call to start the service with a response (e.g., a callback) (block 914).

SCM 464 may determine whether the response indicates that the multicast service started successfully (block 916). If unsuccessful (e.g., the return code indicates is not equal to zero) (block 916: no), SCM 464 may send an alert to device manager 216, indicating that multicast failed and SCM 464 will revert to unicast only mode (block 918). Otherwise (block 916: yes), SCM 464 may wait for a notification of the service start (e.g., wait for a callback message indicating that the host device is entering an eMBMS service).

Middleware 468 may receive a communication from the modem that the host device has entered an eMBMS service area. In response, middleware 468 may invoke a service notification callback to SCM 464, to indicate that the host device is entering an eMBMS service area.

Process 900 may include middleware 468 notifying SCM 464 of a session list (block 920). The callback may provide a list of sessions in eMBMS service area. SCM 464 may receive the list (block 922—FIG. 9B) and determine if the session list includes content_pkg_service_ID provided in session configuration file 700.

Process 900 may also include SCM 464 starting an eMBMS session for receiving content packages when the session list includes content_pkg_service_ID (block 924). For example, SCM 464 may invoke call to receive the content packages. If the host device has remained powered on and SCM 464 has already successfully registered for an eMBMS service, started the eMBMS service and is in an eMBMS service area, then SCM 464 may make the call without repeating one or more actions in blocks 902-922).

When middleware 468 receives the call for the session to download the content package, middleware 468 may command the communications manager in OS 410 to begin the process for downloading files (e.g., for content_pkg_service_ID) (block 926). Middleware 468 may repair/error-correct each downloaded file.

During the session, middleware 468 may download more than one content package. SCM 464 may use the session list and/or the array of unicast URLs in session configuration file to determine how many content packages to expect.

During the session, SCM 464 may have several ways to track or probe information about the downloaded files. For example, SCM 464 may call middleware 468 for the start time and end time for the session. In addition, SCM 464 may receive download progress reports from middleware 468. A report from middleware 468 may indicate a percentage of the file downloaded, including file repair portions. If the time is past the session end time and the report shows that the download is incomplete, SCM 464 may send an alert to device manager 216 indicating a download failure. SCM 464 may then fall back to the unicast only mode.

Process 900 may further include SCM 464 receiving a message, from middleware 468, indicating whether the files have been successfully downloaded (block 928). SCM 464 may use a URL sent from middleware 468 to copy the files downloaded by middleware 468 from the middleware memory to the SCM memory. In some embodiments, SCM 464 may copy the files from the middleware 468 memory to the memory of caching service 462. If the content package(s) were not downloaded successfully, middleware 468 may notify SCM 464. In response, SCM 464 may send an alert to device manager 216, indicating that the file download failed, and that SCM 464 is resorting to the unicast only mode.

SCM 464 may repeat the above actions for receiving content packages over multicast for each file associated with the content package. When SCM 464 has received all of the content packages specified in the session list and/or content_pkg_unicast_URL array, SCM 464 may store the content packages in the memory for caching service 462 and notify caching service 462 that new content packages are waiting to be processed.

Figure 10:
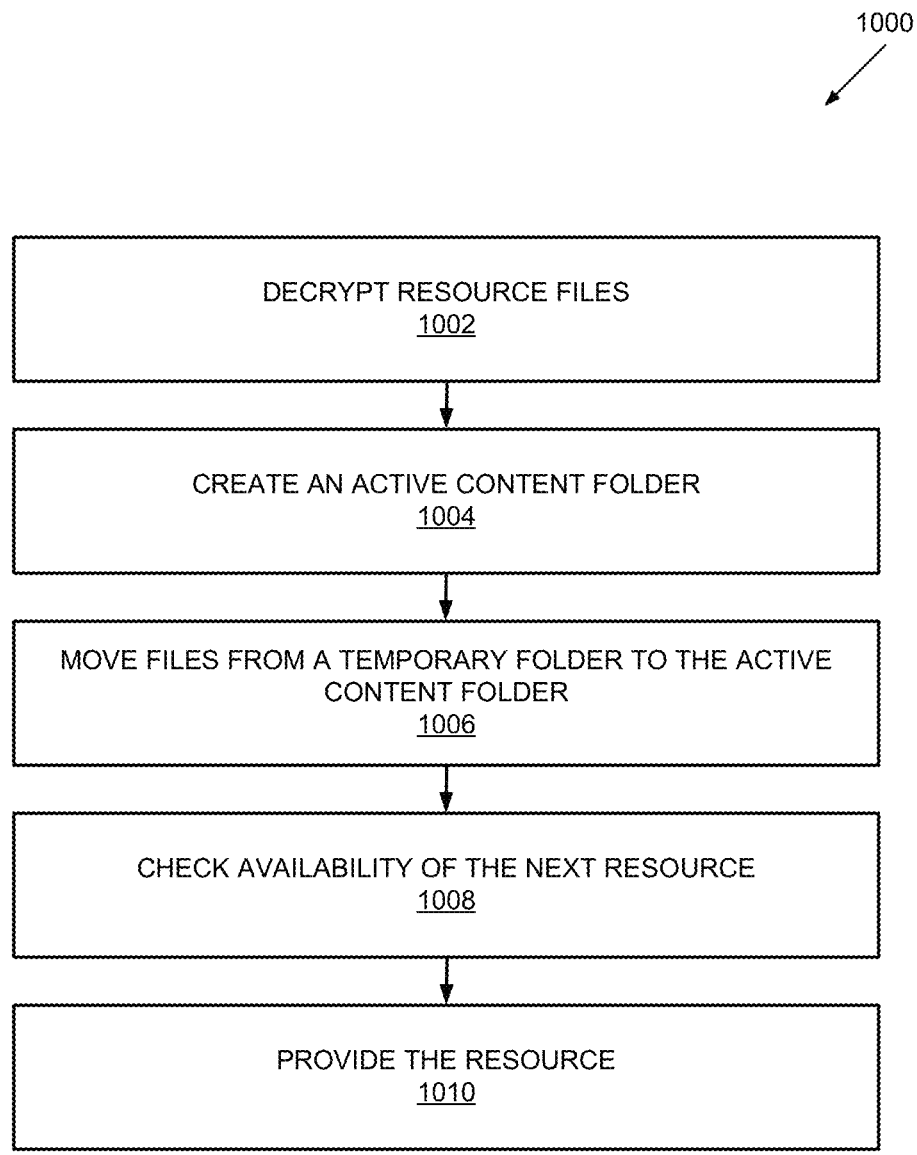
FIG. 10 illustrates an exemplary process that is associated with caching content packages.

FIG. 10 illustrates a process 1000 that is associated with caching content packages received via middleware 468. Caching service 462 may maintain an encryption key in a secure part of memory to decrypt resource files.

Process 1000 may include decrypting resource files (block 1002). Before caching Service 462 serves any resource file for display, caching service 462 may decrypt the resource file using the encryption key it maintains in a secure memory. Caching service 462 may create an active content folder (block 1004). The active content folder is for containing the root and widget folders, with all resources and manifest files.

Process 1000 may also include, when the sign is not displaying any content (i.e., when the active content folder is empty), moving (by caching service 462) all files from the content package folders under the temporary folder to the active content folder (block 1006).

During the move, if the active content folder is populated with the current content after unzipping the new content packages in the temporary folder, caching service 462 may determine a Boolean flag (e.g., the value of a variable widget[ ].full_manifest) for each widget in the root folder within the temporary folder. The flag indicates whether each widget's resource files in the active content folder should be overwritten. Caching service 462 may move resource and manifest files from the temporary folder into the active content folder in accordance with the flag.

For example, if the Boolean flag is true for a particular widget, caching service 462 may move all resource files and manifest files for the widget from the temporary folder into the active content folder. If the flag is set to false, caching service 462 may move that widget's manifest file and copy that widget's resource files from the temporary folder to the active content folder, but preserving the existing resource files, located in the active content folder which were not included in the content package.

When any DSSL module in presenter 440 requests the next resource in a widget's playlist, caching service 462 may check the schedule and/or availability of the resource listed in the widget's manifest file (block 1008). For example, if the value in the property resources[ ]. availability_schedule[ ].start_time for the next widget resource in the playlist is not set, then caching service 462 may provide the resource to the requesting DSSL module.

Depending on the schedule and/or its availability, caching service 462 may provide the resource file to the requesting DSSL module (block 1010). For example, if the availability_schedule[ ].start_time of a widget's resource is equal to or earlier than the current time, then caching service 462 may determine the end time of the resource (e.g., obtain the sum of the availability_schedule[ ].start_time and the availability_schedule[ ].duration for the resource). If the end time is later than the current time, caching service 462 may provide the resource the requesting DSSL module. If the end time is earlier than the current time, caching service 462 may remove the resource from the memory, unless the resource's availability/schedule indicates later start times.

As an example, assume that the current time is 2 PM on Jan. 26, 2018. Also assume that caching service 462 has a request for the next resource in widget1 and that the following is the content of the manifest file for widget1:

```
{
    "version": "74233",
    "customer_id": "customerA",
    "widget": "Widget1"
    "updated": 1441297879410,
    "resources": [
        {
            "id": 0,
            "url": "widget.json",
            "md5": "6487c35f24b11e5b05e8e07f9a609cad",
            "mimetype": "application\/json",
            "availability_schedule": [{
                    "start_time": 1516993200000,
                    "duration": 86400000}]},
        {
        "id": 1001,
        "filename": "videoA.mp4",
        "md5": "24b11e5b05e8e07f9a609cad6487c35f",
        "mimetype": "video\/mp4",
        "availability_schedule": [{
            "start_time":1516993200000,
            "duration": 600000}],
        },
        {
            "id": 1002,
            "filename": "videoB.mp4",
            "md5":
            "a609cad6487c35f24b11e5b05e8e07f9",
            "mimetype": "video\/mp4",
            "availability_schedule": [{
                "start_time": 1516993200000,
                "duration": 86400000 }]
        }]
}
```

In the above example, widget1's resource ID is 1001. The resource ID would be available for the next 10 minutes, because the value in resources[1].availability_schedule[0].start_time is equal to the current time (2 PM on Jan. 26, 2018 is 1516993200000 in seconds) and the value in resources [1].availability_schedule[0].duration is equal to 10 minutes (600000 seconds are 10 minutes). However, at 2:10 PM on Jan. 26, 2018 the resource will expire and caching Service 462 will delete this resource, Caching service 462 will then provide resource ID 1002 because the value in resources[2] .availability_schedule[0].start time is set to 2 PM on Jan. 26, 2018 and the value in resources[2].availability_schedule[0]. duration is set to 1,440 minutes.

Figure 11:
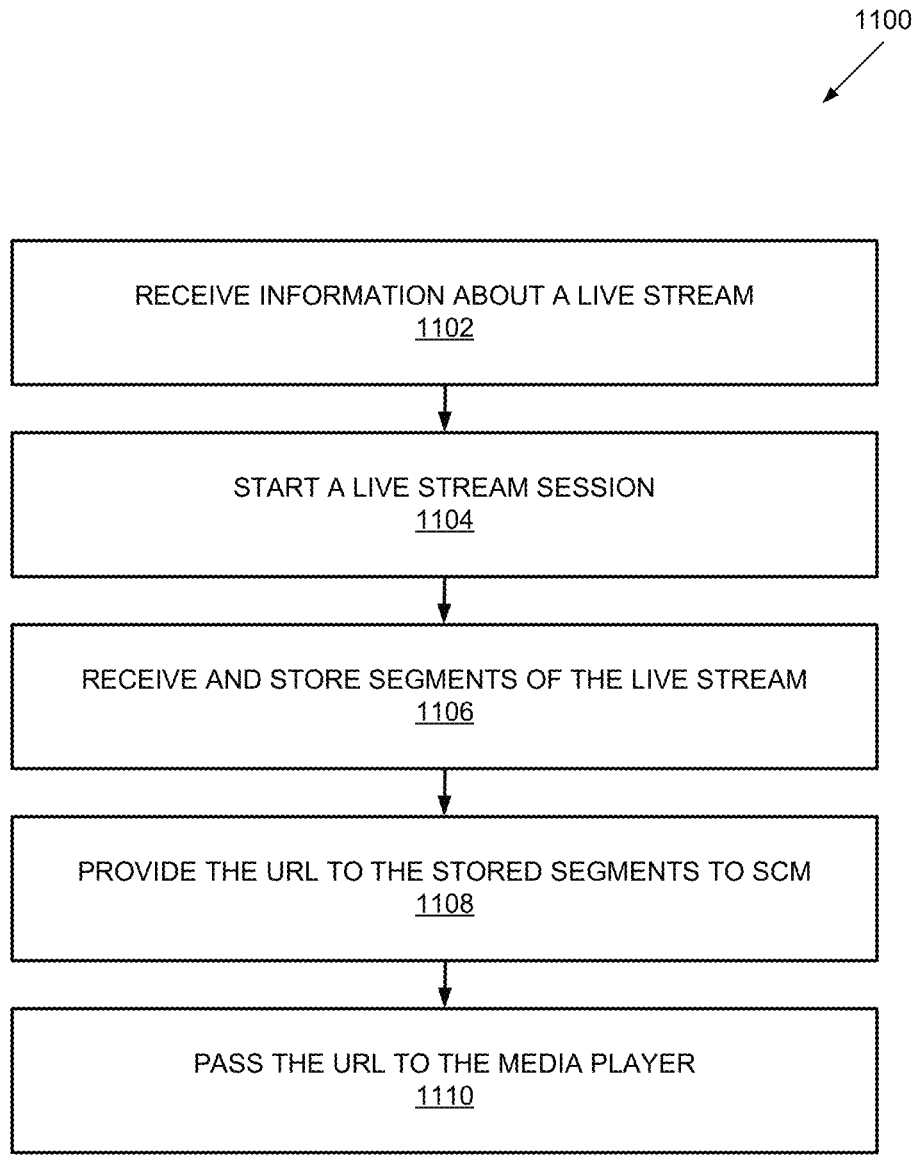
FIG. 11 illustrates an exemplary process that is associated with receiving live content.

FIG. 11 illustrates a process 1100 that is associated with live content. Live content may be received over multicast. When DSMS 214 sends live content, DSMS 214 may include a service ID that is included in the manifest file of widget 104, as well as a URL (for a unicast connection) that will be used to fill in gaps in multicast segments.

As shown, process 1100 may include SCM 464 receiving information about a live stream (e.g., the service ID, the availability schedule, and/or the unicast URL for the live stream) (block 1102). SCM 464 may receive such information when caching service 462 processes the manifest file for widget 104 and finds the multicast service ID for the streaming video.

Based on the availability schedule of the live stream, SCM 464 may initiate a live stream session (block 1104). For example, SCM 464 may call startEMBMSSession( ) with the service ID of the live stream to instruct middleware 468 to command the modem (of the host device) to start the live stream. In one implementation, if SCM 464 has not already performed a multicast initialization sequence (e.g., registration, start service, etc.), SCM 464 needs to perform the initialization before calling startEMBMSSession( ).

Process 1100 may include middleware 468 receiving and storing the segments for the live stream and communicating with SCM 464 (e.g., to indicate a success in starting the session) (block 1106). For example, middleware 468 may invoke the onStartEMBMSSession( ) callback to indicate success (e.g., convey the value of zero).

SCM 464 may request middleware 468 for a URL to the stored multicast segments and middleware 468 may provide the URL (block 1108). For example, SCM 464 may invoke the getMpdUrl( ) function and middleware 468 may respond with the URL of the stored segments.

Process 1100 may further include SCM 464 invoking the Dynamic Adaptive Streaming over HTTP (DASH) player within media player 446 and passing the URL of the stored segments (block 1110). In response, media player 446 may play the stream, in the display, corresponding to widget 104. During process 1100, SCM 464 may fill in any gaps in the multicast stream with segments from a unicast stream, using the unicast URL provided by caching service 462.

At block 1104, if middleware 468 is unable to start the live stream session, middleware 468 may respond to SCM 464. In such a case, SCM 464 may wait to receive a callback from middleware 468 to obtain further information about the failure (e.g., a failure code indicating that middleware 468 is unable to start the session) and send an alert to device manage 216.

FIG. 12 illustrates an exemplary template 1200 that DSSL 420 may display. In template 1200, a body section is below a header. The body section includes the width and height dimensions of each widget 104. In a different implementation, the widget dimensions may be included in a style sheet definition. In FIG. 12, the body section also includes tags for video (<video>), image (<img>) or division (<div>) which defines different content types.

For displaying template 1200, HTML application 442 may set the widget dimensions by giving priority to the width and height tags within the widget definition in template 1200. For example, the dimensions in <video id="widget1" src="widget:///Widget1" width="1080" height="609"></video> would have precedence over any other widget dimension definition for widget1 in the example. The width and height tags may be optional in the widget definition.

If the width and height dimensions for the widget are missing from the widget definitions, then HTML application 442 may use the widget dimensions defined in the style sheet section of the template.

In displaying a template, HTML application 442 may follow a number of rules. For example, if the width and height dimensions for widget 104 are absent from the widget source definition and from the style sheet definition in the template, then HTML application 442 may use the width and height dimensions that are associated with the resource itself.

In some implementations, a template may follow certain conventions. For example, in one implementation, a widget source definition may use the "id" tag to define the widget name as referenced in a style sheet entry. For example, id="widget1." A widget source definition may use the "src" tag followed by "widget:///" to indicate that the src tag is under DSSL 420's control and not under the control of another component. For example, src="widget:///Widget1."

In displaying a template, HTML application 442 may rely on other conventions. For example, HTML application 442 may interpret the image HTML tag (ie <img>) in a widget source definition to mean that the content displayed in the widget shown in the display will be restricted to still images only. In contrast, HTML application 442 may interpret the video HTML tag (ie. <video>) in a widget source definition to mean that the content displayed in the widget will be restricted to videos only. In another example, HTML application 442 may interpret the division HTML tag (i.e., <div>) in a widget source definition to mean that the content displayed in the widget will include a still image, video, or other type of HTML resource.

In some implementations, if a data-interval tag is present in a widget source definition that defines a video only widget (i.e., using the <video> tag), HTML application 442 may ignore the data-interval attribute and honor the length of the video resources in the widget. If the data-interval tag is present in the widget source definition that defines an image only widget (i.e., using the <img> tag), HTML application 442 may use the data-interval value to define the amount of time (e.g., in milliseconds) the image is to be shown. For example, data-interval="10000" may mean that each image resource will be displayed for 10 seconds. If the data-interval tag is present in a widget source definition that defines a division widget (i.e., using the <div> tag), HTML application 442 may use the data-interval value to define the amount of time (e.g., in milliseconds) an image or HTML resource will be displayed. However, if the resource is a video, HTML application 442 may ignore the data-interval tag and honor the length/duration of the video.

FIG. 13 illustrates an exemplary business rules file 1300 for business logic 444. Business logic 444 may process file 1300 and/or another file (e.g., widget.json file) to request resources from caching service 462. In FIG. 13, the file is a JSON file (i.e., rules.json file). The area of the sign designated for one widget in a template would have two widgets assigned to it, where a primary widget is defined to use another widget as a fallback.

In FIG. 13, widget1 is configured to use widget3 as a fallback so that if the content in widget1 is not available, then business logic 444 would play resources from widget3 instead. In the example, widget3 has a flag (e.g., the preserve_state flag) set to 'true' to indicate that whenever widget3 is selected to play its resources, business logic 444 may request the next resource in the playlist from where it left off in widget playlist.

Business logic 444 may request a resource for the primary widget from caching service 462. If the content in the primary widget's resource playlist is not available, business logic 444 may check the widget's fallback identifier (e.g., fallback_id in the rules.json file). If the primary widget's fallback ID is given (e.g., not equal to zero), business logic 444 may request resources from caching service 462 for the fallback widget instead. Business logic 444 may continue requesting the resource(s) for the primary widget from caching service 462. Once a resource in the primary widget's playlist is available, business logic 444 may begin playing resources from the primary widget's playlist when the current resource in the fallback widget's playlist has been displayed.

If a flag (e.g., preserve flag) is set to 'true' for any widget in a business rules file, business logic 444 may recall the last resource that was played in that widget's playlist and move to the next resource in the playlist.

FIG. 14A illustrates another exemplary business rules file 1400 for business logic 444. Business logic 444 may process file 1400 and/or another file (e.g., widget.json file) to request resources from caching service 462 unless there is a coordinated content condition.

In the example, a sign is configured so that one widget on the sign displays specific content and another widget on the sign simultaneously displays related content, business logic 444 may use a selector (e.g., widget[ ].selector object in the rules.json file) to coordinate the two widgets.

Rules.json file in FIG. 14A defines the dependency between two widgets. In FIG. 14A, WidgetStat (id=200) depends on WidgetTop (id=100) based on the Widgets[ ].selector. widget_ID property in rules.json file 1400. The Widgets[ ].selector.offset property defines which resource to select.

FIG. 14B illustrates widget.json files that provide additional details. In FIG. 14B, WidgetStat's resource ID 1 depends on WidgetTop's resource ID 1001 (see item 1430) and WidgetStat's ID 2 depends on WidgetTop's resource ID 1002 (see item 1440). This indicates that resource 1001 in WidgetTop and resource 1 in WidgetStat are to be played simultaneously and resource 1002 in WidgetTop and resource 2 in WidgetStat are also to be played simultaneously.

Business logic 444 may check if the selector property is populated when business logic 444 processes the rules (e.g., in the rules.json file). If the selector property is empty for all widgets 104 defined in the rules, then business logic 444 may proceed to request resources for the sign. If the selector property contains a widget ID for any widget 104 defined in the rules, business logic 444 may not request resources for that widget 104 until business logic 444 processes another file (e.g., widget.json file) for that widget.

For any widget resource that has its selector ID set to another widget 104's resource, business logic 444 may only request that resource when the resource identified by the selector ID is being displayed in the selecting widget 104, as defined in the rules (e.g., in rules.json file).

Figure 15:
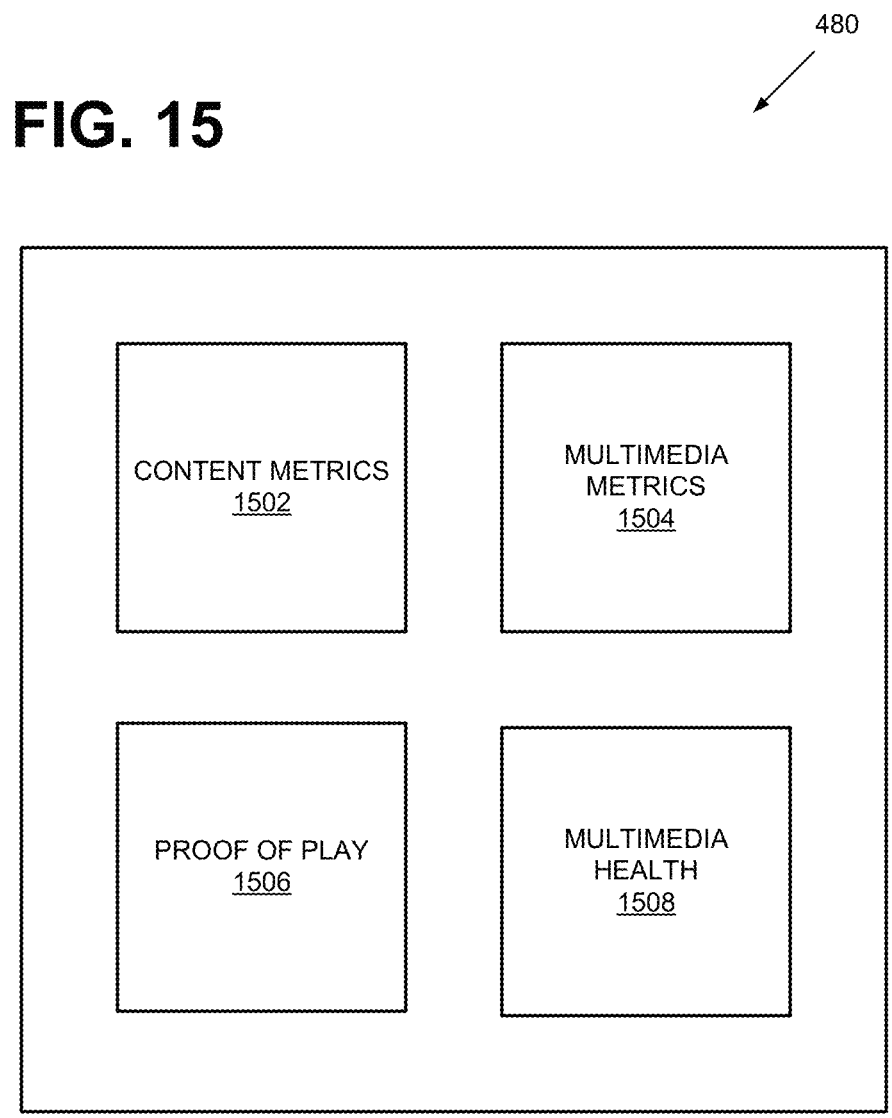
FIG. 15 illustrates exemplary components of the metrics module of FIG. 4.

FIG. 15 illustrates exemplary components 1502-1508 of metrics module 480 according to one implementation. Metrics module 480 may perform several functions, in addition to those decribed above with respect to FIG. 4.

For example, metrics module 480 may send content package reports and multimedia reports to DSMS 214 according to the configuration parameters (e.g., file 500). In some implementations, metrics module 480 may be configurable to send either a periodic report or a report sent as soon as it receives data from SCM 464 or caching service 462.

When sending reports, metrics module 480 may direct the reports to an address specified in a configuration file (e.g., metrics_reporting_server_URL in DSSL configuration file 500) via HTTP client 466. In some implementations, metrics module 480 may send the minimum of one metrics report to the specified address at specified times (e.g., once every 24 hours, every 2-3 days, every week, etc.).

Metrics module 480 may also use an interval parameter (e.g., metrics_reporting_interval in configuration file 500) to determine the frequency of its reports (e.g., to the metrics_reporting_server_URL). In one implementation, metrics module 480 may also use metrics_reporting_offset_time in configuration file 500 to determine specific time (e.g., how many minutes past midnight of the calendar day) to begin sending reports to DSMS 214.

Metrics module 480 may set a watchdog timer and send a watchdog timer event to DSMS 214. When the timer expires, metrics module 480 may send another watchdog timer event to DSMS 214 and restart the watchdog timer. If DSMS 214 does not receive a pre-specified number (e.g., three) of consecutive Watchdog Timer events, DSMS 214 may restart DSSL client 232.

Referring to FIG. 15, as shown, metrics module 480 may include content package metrics 1502, multimedia metrics 1504, proof of play 1506, and multimedia health 1508. Depending on the implementation, metrics module 480 may include additional, fewer, or different components than those illustrated in FIG. 15.

Content package metrics 1502 may process content package data. SCM 464 may collect data for multicast and unicast content package file downloads, successfully received or not, while caching service 462 collects specific content package data. Metrics module 480 may collect the data from SCM 464 and caching service 462 and send periodic reports to DSMS 214.

When SCM 464 successfully receives a content package over unicast or multicast, SCM 464 may record the multicast service ID (e.g., a NULL value if multicast was not used), the URL of the content package, the content package file name, the size of the content package (e.g., in number of bytes). SCM 464 may also collect similar data when it does not successfully receive a content package. SCM 464 may make the recordings in a file (e.g., a JSON formatted file), and send the JSON formatted file to metrics module 480 for each content package received. FIG. 16 illustrates an exemplary schema to populate a reporting file (with name-value pairs) that SCM 464 may send to metrics module 480 for content package metrics 1502.

When metrics module 480 receives the content package report from SCM 464, metrics module 480 may send a report to DSMS 214. In one implementation, the reporting file may be in JSON format and may include name-value pairs.

When caching service 462 receives a content package from SCM 464, caching service 462 may record the current time, the widget identifier, the number of resources in widget 104 and whether or not the content package was received over multicast. Caching service 462 may make the recordings in a file, and send the file to metrics module 480 for each received content package. In one implementation, the reporting file may be in JSON format and may include name-value pairs. FIG. 17 illustrates an exemplary schema for populating a reporting file (with name-value pairs) sent from caching service 462 to metrics module 480 for content package metrics 1502. Upon receipt of the report, metrics module 480 may then forward it to DSMS 214.

Referring to FIG. 15, multimedia metrics 1504 may include multimedia metrics data and functions associated with the data. When SCM 464 receives streaming video, SCM 464 may record one or more of the following: a multicast service ID, the unicast URL of the streaming video, a starting segment identifier, an ending segment identifier, the total number of bytes received, the number of bytes received over multicast, the number of bytes received over unicast, a widget ID and a resource ID. SCM 464 may record the information in a reporting file. In one implementation, the reporting file may be in JSON format and may include name-value pairs. FIG. 18 illustrates an exemplary schema for populating a reporting file that may be sent from SCM 464 to metrics module 480 for multimedia metrics 1504.

SCM 464 may periodically send (e.g., every 5 minutes) such reporting files to metrics module 480. Metrics module 480 may buffer and forward the reporting file (as a standalone report or as part of its regular report) to DSMS 214.

Referring back to FIG. 15, proof of play 1506 may list resources that have been played, for every widget 104 on a template. In one implementation, proof of play 1506 may store the list in a file (e.g., JSON file).

When caching service 462 serves a resource file to business logic 444 or to media player 446 for display, caching service 462 may send an event (e.g., Start Display event) or a signal to metrics module 480. The event may be provided in JSON format and may include name-value pairs. FIG. 19 illustrates an exemplary schema for an event, which may be forwarded from caching service 462 to metrics module 480 and which may be used for the proof-of-play.

In receipt of the event or signal from caching service 462, metrics module 480 may copy the data into a proof-of-play file. Similarly, when caching service 462 receives a request for the next resource in the same widget 104, caching service may send a stop display event or signal to metrics module 480 for the previously requested resource. Upon receiving the event or the signal, metrics module 480 may copy the data into the proof-of-play file.

In some implementations, metrics module 480 may send a reporting file, which includes the contents of the proof-of-play file (or is the same as the proof-of-play file) to DSMS 214 at regular intervals (e.g., every 60 minute). The reporting file may be in JSON format and may include name-value pairs. FIG. 20 illustrates an exemplary schema for populating a reporting file, which indicates proof-of-play and which may be sent from metrics module 480 to DSMS 214.

Returning to FIG. 15, multimedia health 1508 may include data and software components for receiving events and signals from media player 446. FIG. 21 illustrates a list of parameters that media player 446 may send to metrics module 480 regarding multimedia health 1508.

Figure 22:
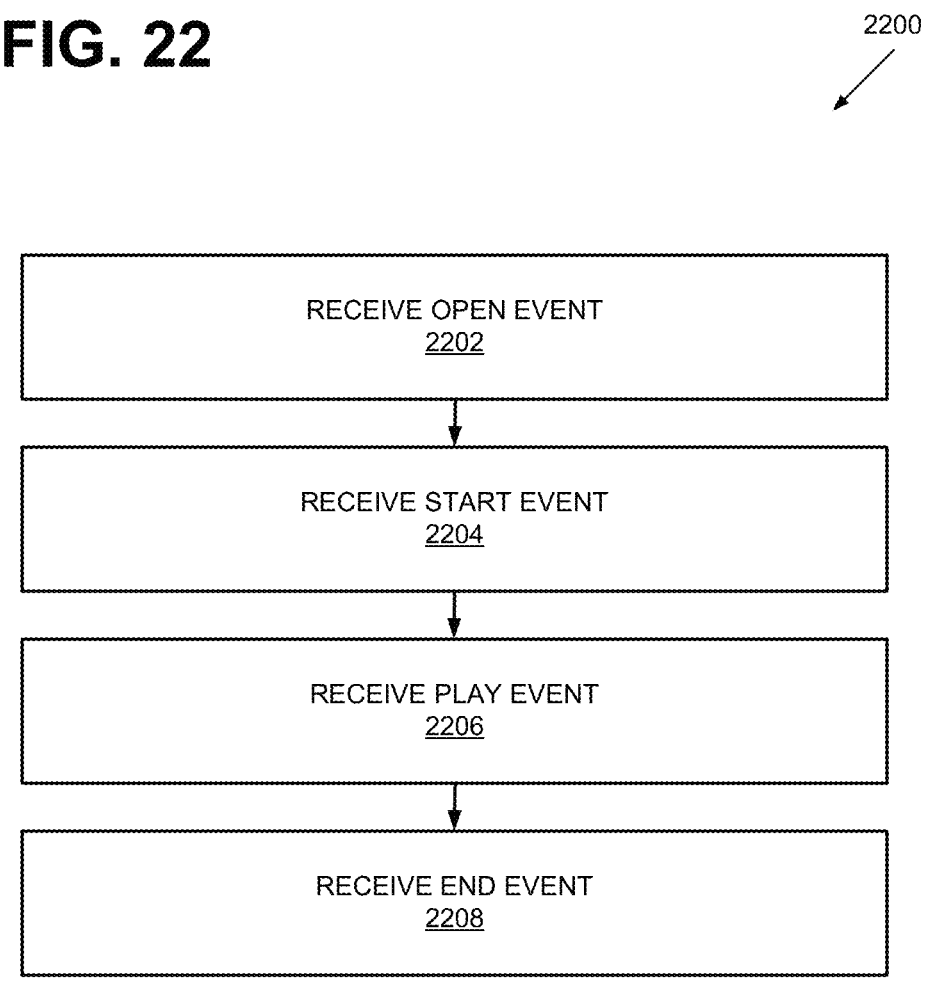
FIG. 22 illustrates an exemplary process that is associated with multimedia health.

FIG. 22 illustrates an exemplary process 2200 that is associated with multimedia health 1508. As shown, process 2200 may include metrics module 480 receiving an open event from media player 446 (e.g., opening a resource) (block 2202). When metrics module 480 receives the open event from media player 446, metrics module 480 may record the timestamp of the open event, the URI of the resource that was opened, and prepare error counters for this resource for additional events, such as: Fail, Codec Error and Frame Drop events.

Metrics module 480 may receive a start event from media player 446) when a start, the start of playing occurs (block 2204). Upon receipt of the start event from media player 446, metrics module 480 may record the event and the timestamp, and begin counting any error events received from media player 446, for the current resource being played by media player 446.

Metrics module 480 may receive a playing even from media player 446 when playing the resource (block 2206). When metrics module 480 receives the playing event from media player 446, metrics module 480 may record the event and the timestamp.

Process 2200 may further include metrics module 480 receiving an end event from media player 446 (e.g., to indicate that a play of a resource has ended) (block 2208). When metrics module 480 receives the end event (or the signal or the message) from media player 446, metrics module 480 may record the event and the timestamp.

Although not illustrated in FIG. 22, during process 2200, media player 446 may generate a number of error events. For example, media player 446 may generate a fail error event, codec error event, and/or frame drop event. Metrics module 480 may receive the error events and take appropriate actions.

Figure 23:
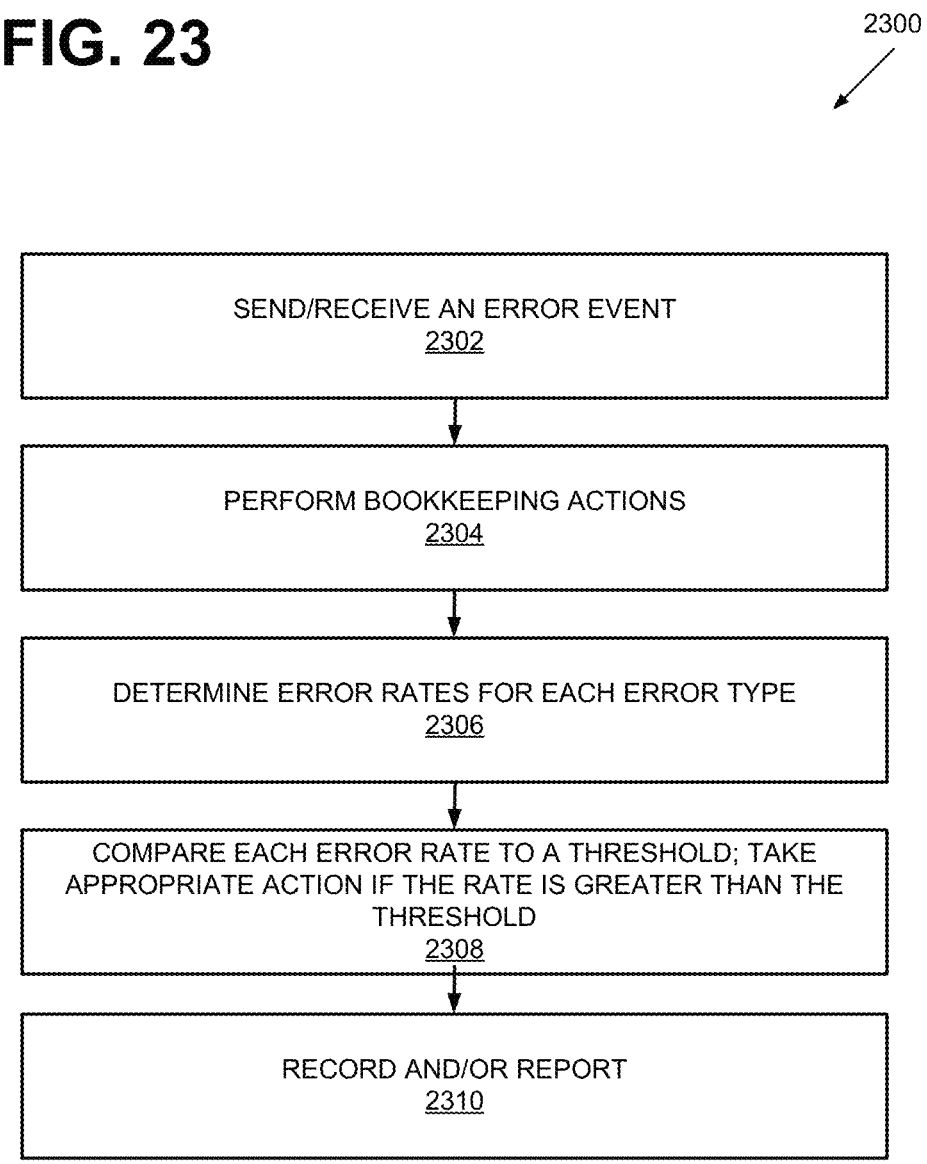
FIG. 23 illustrates an exemplary process that is associated with handling errors.

FIG. 23 illustrates an exemplary process 2300 for handling error events. As shown, process 2300 may include receiving an error event (block 2302). When an error occurs, media player 446 may forward a corresponding error event to metrics module 480.

When metrics module 480 receives the error event, the metrics module may perform bookkeeping actions (block 2304). For example, when metrics module 480 receives an error, metrics module 480 may increment a corresponding error counter (e.g., a fail counter, codec counter, or frame drop counter), timestamp the received event, and/or record the event (e.g., in a file).

Metrics module 480 may determine an error rate for each error type (e.g., fail error, codec error, and frame drop) (block 2306). To determine the error rate, metrics module 480 may divide the number of error events (of a type) by the duration of play (e.g., the cumulative number of seconds/minutes/hours the resource has played. The duration of play can be computed using the start event timestamp and the current event/epoch timestamp and making proper time unit conversions.

Metrics module 480 may compare, for each error type, the computed error rate to the threshold for that error type (block 2308). If the error rate is greater than the threshold, metrics module 480 may take appropriate actions, such as: stop displaying the current resource; quarantine the current resource by sending a message to caching service 462; and/or inform business logic 444 to display the next widget resource or fallback widget resource.

Metrics module may record the number and/or error events, its corresponding error rate, etc. (block 2310). If metrics module 4 480 quarantined a resource, metrics module 480 may set the quarantine flag in the report to "true."

FIGS. 24A and 24B illustrate an exemplary business rules manifest schema. FIG. 25 illustrates an exemplary widget manifest schema. FIGS. 26A and 26B illustrate an exemplary content package manifest schema. In some implementations, the schemas illustrate the components of various files (e.g., files in content packages) discussed above.

In this specification, various preferred embodiments have been described with reference to the accompanying drawings. It will be evident that modifications and changes may be made thereto, and additional embodiments may be implemented, without departing from the broader scope of the invention as set forth in the claims that follow. The specification and drawings are accordingly to be regarded in an illustrative rather than restrictive sense.

For example, in the above, although many implementations have been described as using IMEI, other types of device/software identifiers may be used in its place. In another example, rather than JSON formatted files, another type of data structures may be used for component communications and between DSSL client 232, DSMS 214, and other components. Furthermore, rather than using REST interface, another type of architecture may be used for having DSSL 420 communicate with servers.

In the above, while a series of blocks have been described with regard to the processes illustrated in FIGS. 6, 8, 9A, 9B, 10, 11, 22, and 23, the order of the blocks/actions may be modified in other implementations. In addition, non-dependent blocks may represent blocks that can be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

To the extent the aforementioned embodiments collect, store or employ personal information provided by individuals, it should be understood that such information shall be used in accordance with all applicable laws concerning protection of personal information. The collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, block, or instruction used in the present application should be construed as critical or essential to the implementations described herein unless explicitly described as such. Also, as used herein, the articles "a," "an," and "the" are intended to include one or more items. Further, the phrase "based on" is intended to mean "based, at least in part, on" unless explicitly stated otherwise.

What is claimed is:

1. A method comprising:
    downloading a session configuration file from a server over a network;
    obtaining one or more parameters from within the session configuration file;
    downloading a content package based on the one or more parameters;

storing the content package in a temporary folder;
uncompressing the content package into a content folder in the temporary folder, wherein the content folder includes resources that correspond to widgets in a template, wherein the content folder further includes the template, and wherein the template specifies a layout of the widgets on a page to be output to a display device;
creating an active content folder, wherein the active content folder is different from the temporary folder;
determining availability of a resource within the content folder based on a schedule, for displaying or playing the resource, wherein the schedule is included in the content package, and wherein the schedule was provided to the server and combined into the content package at the server;
when the resource is determined to be available based on the schedule, performing copying the resource from the temporary folder into the active content folder;
and playing the resource as part of the page output at the display device in accordance with the layout.

2. The method of claim 1, wherein downloading the content package includes:
downloading the content package over a multicast session when a multicast service can be started; and
when the multicast service cannot be started, downloading the content package over a unicast session.

3. The method of claim 1, further comprising:
receiving a live stream;
obtaining and storing one or more segments corresponding to the live stream over a multicast session; and
providing universal resource locators for the segments to a media player.

4. The method of claim 1, wherein, when the resource is determined to be unavailable based on the schedule, identifying another widget as a fallback widget; and
in the widget, playing a resource for the other widget.

5. The method of claim 1, wherein the content package includes a business rule that specifies: when the widget plays the resource, a second widget in the template is to play another resource, wherein the method further comprises playing the other resource in the second widget when the widget plays the resource, in accordance with the business rule.

6. The method of claim 1, wherein downloading the session configuration file includes:
when a version of the session configuration file does not match a version number in a second configuration file, re-downloading the session configuration file.

7. The method of claim 1, wherein downloading the content package includes:
determining whether a first MD5 of the downloaded content package matches a second MD5 in the session configuration file, and
when the first MD5 and the second MD5 do not match, re-downloading the content package.

8. The method of claim 1, wherein playing the resource includes:
counting a number of errors when the resource is playing,
calculating an error rate based on the number of errors, and
quarantining the resource when the error rate exceeds a predetermined threshold.

9. The method of claim 8, wherein errors include at least one of:
a dropped frame error, a fail to play error, or a codec error.

10. The method of claim 1, wherein the template is a Hypertext Markup Language (HTML) document.

11. The method of claim 1, wherein uncompressing the content package includes decrypting the content package.

12. A non-transient computer-readable medium, comprising computer-executable instructions, when executed by a processor, cause the processor to:
download a session configuration file to a device from a server over a network, wherein the device includes the one or more processors;
obtain one or more parametersfrom within the session configuration file;
download a content package based on the one or more parameters; store the content package in a temporary folder;
uncompress the content package into a content folder in the temporary folder, wherein the content folder includes resources that correspond to widgets in a template, wherein the content folder further includes the template, and wherein the template specifies a layout of the widgets on a page to be output to a display device;
create an active content folder, wherein the active content folder is different from the temporary folder;
determine availability of a resource within the content folder based on a schedule, for displaying or playing the resource, wherein the schedule is included in the content package, and wherein the schedule was provided to the server and combined into the content package at the server;
when the resource is determined to be available based on the schedule, perform:
copy the resource from the temporary folder into the active content folder;
and play the resource as part of the page output at the display device in accordance with the layout.

13. The non-transient computer-readable medium of claim 12, wherein when the processor downloads the content package, the processor is further to: download the content package over a multicast session when a multicast service can be started; and when the multicast service cannot be started, download the content package over a unicast session.

14. The non-transient computer-readable medium of claim 12, wherein the processor is further to: receive a live stream; obtain and store one or more segments corresponding to the live stream over a multicast session; and provide universal resource locators for the segments to a media player.

15. The non-transient computer-readable medium of claim 12, wherein, when the processor determines that the resource is not available based on the schedule, the processor is to: identify another widget as a fallback widget; and in the widget, play a resource for the other widget.

16. The non-transient computer-readable medium of claim 12, wherein the content package includes a business rule that specifies: when the widget plays the resource, a second widget in the template is to display another resource, wherein the processor is further to play the other resource in the second widget when the widget plays the resource, in accordance with the business rule.

17. The non-transient computer-readable medium of claim 12, wherein when the processor downloads the session configuration file, the processor is to: when a version of the session configuration file does not match a version number in a second configuration file, re-download the session configuration file.

18. The non-transient computer-readable medium of claim 12, wherein when the processor downloads the content package, the processor is to: determine whether a first MD5 of the downloaded content package matches a second MD5 in the session configuration file, and when the first MD5 and the second MD5 do not match, re-download the content package.

19. The non-transient computer-readable medium of claim 12, wherein when the processor plays the resource, the processor is to: count a number of errors when the resource is playing, calculate an error rate based on the number of errors, and quarantine the resource when the error rate exceeds a predetermined threshold.

20. The non-transient computer-readable medium of claim 19, wherein errors include at least one of: a dropped frame error, a fail to play error, or a codec error.

* * * * *